United States Patent [19]

Tazou et al.

[11] Patent Number: 5,671,837

[45] Date of Patent: Sep. 30, 1997

[54] PANEL DISTRIBUTION SYSTEM AND PANEL DISTRIBUTING METHOD CARRIED OUT BY THE SAME

[75] Inventors: Ken Tazou; Tsugio Ueno; Kazuyoshi Takaya; Takashi Kitamura; Mitsuo Ushida, all of Sayama, Japan

[73] Assignee: Honda Giken Kogyo Kabushiki Kaisha, Japan

[21] Appl. No.: 640,203

[22] Filed: Apr. 30, 1996

[30] Foreign Application Priority Data

| May 8, 1995 | [JP] | Japan | 7-109633 |
| May 9, 1995 | [JP] | Japan | 7-110976 |
| May 9, 1995 | [JP] | Japan | 7-110980 |

[51] Int. Cl.[6] .................................... B65G 37/00
[52] U.S. Cl. .................. 198/369.2; 198/370.7; 198/370.8; 414/789.6; 414/786
[58] Field of Search ............... 414/789.6, 791.6, 414/786; 198/370.07, 370.08, 369.2; 901/7

[56] References Cited

U.S. PATENT DOCUMENTS

| 2,497,874 | 2/1950 | Evans et al. | 198/369.2 |
| 2,942,715 | 6/1960 | Miller | 198/370.07 |
| 3,101,475 | 8/1963 | Petersen et al. | 198/369.2 |
| 3,522,942 | 8/1970 | Hepp | 198/370.08 |
| 4,287,459 | 9/1981 | Dahlström | 907/7 |
| 4,850,471 | 7/1989 | Annas, Sr. et al. | 198/370.08 |
| 5,372,472 | 12/1994 | Winski et al. | 414/789.6 |
| 5,415,518 | 5/1995 | Montgomery | 414/791.6 |
| 5,437,533 | 8/1995 | VanderMeer et al. | 414/791.6 |
| 5,562,403 | 10/1996 | Winski | 414/791.6 |

FOREIGN PATENT DOCUMENTS

| 2377346 | 9/1978 | France | 414/789.6 |
| 62-83970 | 4/1987 | Japan | |
| 5-317998 | 12/1993 | Japan | |

*Primary Examiner*—Karen B. Merritt
*Assistant Examiner*—Douglas Hess
*Attorney, Agent, or Firm*—Merchant, Gould, Smith, Edell, Welter & Schmidt, P.A.

[57] ABSTRACT

A panel distribution system includes a plurality of panel delivery units disposed on a panel conveyance line for forcing out panels in a lateral direction from the conveyance line. The delivery units are all operative to allow the passage of the panels through them except one located closer to a downstream end of the conveyance line. A plurality of loading conveyor units having a two-storied construction composed of a pair of overlapping upper and lower loading conveyors can be disposed on the same side of the conveyance line and held in alignment with the corresponding delivery units. This concentrated high-density arrangement of the loading conveyors can make considerable reductions in floor space of the entire system with a minimum dead space involved. In one preferred form, the panel conveyance line extending from a transfer press and the upper and lower loading conveyors are aligned with each other, so that a further reduction in size of the entire system is possible. Since the panels while being conveyed are not subjected to a directional change and hence free from displacement, the panel loading work can be achieved easily and reliably. According to a panel distribution method of the invention, the storage density of baskets used can be increased by a properly handling procedure provided for a few odd panels.

9 Claims, 23 Drawing Sheets

PANEL DISTRIBUTION SYSTEM AND PANEL DISTRIBUTING METHOD CARRIED OUT BY THE SAME

BACKGROUND OF THE INVENTION

1. Field of the Invention

The present invention relates generally to a system for and a method of distributing press-formed components such as panels sent out from a transfer press, and more particularly to a panel distribution system which is simple in construction, requires a small floor space, and can be laid out with good efficiency, as well as to a panel distribution system carried out by the system.

2. Description of the Related Art

A transfer press has a plurality of molds or dies which forms a sheet metal into its final shape by a series of press operations. The transfer press is particularly suitable for the mass-production and frequently used in the automobile industry. However, due to its high production rate, the transfer press when used for the production of press-formed vehicle body components (panels), for example, may encounter a problem that the press-formed panels coming out from the transfer press gradually pile up on the downstream side of the transfer press. This is due to a lower capacity of a robot or the like handling means disposed on the downstream side of the transfer press. The panel loading operation achieved by such a low capacity handling means cannot follow the throughput of the transfer press.

To deal with this problem, Japanese Patent Laid-Open Publication No. SHO 62-83970 discloses an automatic loading system in which press-formed panels continuously supplied from an intermittent feeding apparatus are automatically loaded into a plurality of containers.

The disclosed automatic loading system is, due to the necessity of handling the continuously supplied press-formed panels with no pile-up problem, provided with a plurality of loading apparatus or units and a plurality of containers combined together to form a loading section or station. Since the loaded section is laid in a decentralized manner over a large area of the working site, the layout of this loading system involves a great spatial losses.

To eliminate the spatial losses, the present as-signee has proposed an automatic panel loading system such as disclosed in Japanese Patent Laid-Open Publication No. HEI 5-317998.

The disclosed automatic panel loading system is diagrammatically illustrated here in FIG. 22. As shown in the same figure, the automatic panel loading system generally comprises a conveyance line 202 for taking out press-formed products, such as panels, from a transfer press T, a vertical two-directional delivery conveyor 203 for delivering the panels selectively into two vertically spaced destinations, a two-storied horizontally two-directional delivery conveyor 204 for receiving the panels from the vertical delivery conveyor 203 and delivering the panels on each story selectively into two horizontally spaced destinations, and a plurality of loading sections or stations 205 disposed on the respective destinations of the horizontally two-directional delivery conveyor 4. The panel loading system further includes a plurality of upper and lower loading robots 206, 207 or the like loading means for loading the panels from the loading stations 205 into a plurality of upper and lower container means (baskets) 208, 209.

By virtue of the two-storied conveyors, the panel loading system of the foregoing construction can make a certain reduction in floor space, however, a further improvement in utilization factor of the floor space is desired because the system stall has a large dead space generated due to the loading stations 205 spreading laterally in opposite directions with respect to a longitudinal central axis of the conveyance line 202. Furthermore, since the panel conveyance direction is changed at an angle of 90 degrees at the horizontal two-directional delivery conveyor 204, the panels are liable to postural change or misorientation. Once such misorientation takes place, the loading robots might fail to handle and thereby load the misoriented panels into the baskets.

Two baskets 208, 209 are disposed on opposite sides of each loading robot 206, 207 for receiving the panels as they are loaded by the loading robots 206, 207. When one of the baskets 208, 209 is filled up with the panels a subsequent loading operation will be achieved using the other basket during which time the filled basket 208 or 209 is replaced with an empty basket. Thus the panel loading operation can be continued without interruption.

FIG. 23 schematically illustrate a storage condition of baskets observed at the end of a panel loading operation of the conventional panel loading system described above. Each of the baskets 208, 209 has a capacity large enough to contain ten panels P. Since the throughput of the transfer press T and the capacity of the baskets 208, 209 are not linked or interrelated, the panel loading operation may end in the condition shown in FIG. 23 in which one of the upper baskets 208 contains three panels P and the other upper basket 20 contains two panels P. For purposes of administration, the half-filled baskets 208, 209 are transported into a warehouse for storage.

The time and labor required for the transportation of empty or half-filled baskets to the warehouse are the same as those required for the transportation of filled baskets. Furthermore, the empty or half-filled baskets need the same storage space as the filled baskets. Accordingly, storage of the empty or half-filled baskets should increase a total number of baskets used and the necessary storage space of the warehouse and hence is totally undesirable from the view point of utility of the warehouse.

SUMMARY OF THE INVENTION

It is, accordingly, an object of the present invention to provide a panel distribution system including loading stations arranged in one side of a conveyance line to reduce the overall size and the necessary floor space of the entire system.

Another object of the present invention is to provide a panel distribution system including loading sections aligned with a conveyance line to reduce the necessary space for installation and secure conveyance of panels without changing the posture or orientation of the panels.

A further object of the present invention is to provide a panel distribution method which is capable of reducing a total number of baskets used and improving the utility factor of the baskets by centralizing a final part of the panel loading operation to one of two baskets.

To attain the first-mentioned object, the present invention provides a panel distribution system for distributing panels press-formed on a transfer press, the system including a conveyance line for taking out the panels from the transfer press, a plurality of delivery units disposed on the conveyance means and spaced from each other along the longitudinal direction of the same for forcing out the panels in a lateral direction from the conveyance line, and a plurality of loading conveyors each associated with a corresponding one of the plural delivery units for receiving the panels delivered from the corresponding delivery units and loading the panels into a container means. The loading conveyors are disposed on the same side of the conveyance line and aligned with the respective delivery units. And, the delivery units are all operative to allow the passage of the panels through them except one located closer to a downstream end of the conveyance line.

Since the upstream distributing unit is operative to open and close the conveyance line to allow the passage of the panels through the same distribution unit, all of the upper and lower loading conveyors can be disposed on the same side of the conveyance line. With this centralized arrangement of the loading conveyors, a considerable reduction in floor space of the entire system is obtained with a minimum dead space involved. Thus, highly efficient use of the floor space is possible.

Each of the delivery units preferably includes a stopper which is capable of opening and closing the conveyance line to selectively allow and arrest the passage of the panels through the delivery unit.

Preferably, an overhead hanger is disposed at a downstream end of each of the loading conveyors so that the panels can be loaded on the overhead hanger regardless of the size and configuration of the panels.

To attain the second-mentioned object, the present invention provides a panel distribution system for distributing panels coming out from a transfer press, the system including a pair of juxtaposed vertical two-directional delivery conveyors for directing the panels coming out from the transfer press, selectively into an upper position and a lower position, and a pair of juxtaposed loading stations each composed of a pair of overlapping upper and lower loading conveyors disposed adjacent to a delivery end of a corresponding one of the vertical two-directional delivery conveyors for receiving the panels at the upper position and the lower positions, respectively, and then transferring the panels in a downstream direction. The vertical two-directional delivery conveyors and the loading stations are aligned with each other and extends linearly from the transfer press so as to jointly define a straight conveyance line. The upper loading conveyors of the pair of loading stations include first panel positioning means for positioning the panels such that when two small panels are being conveyed on the upper loading conveyors, the small panels are positioned on the respective upper loading conveyors independently from each other, and when one large panel is being conveyed on the upper loading conveyors, the large panel is positioned on the upper loading conveyors. Similarly, the lower loading conveyors of the pair of loading stations include second panel positioning means for positioning the panels such that when two small panels are being conveyed on the lower loading conveyors, the small panels are positioned on the respective lower loading conveyors independently from each other, and when one large panel is being conveyed on the lower loading conveyors, the large panel is positioned on the lower loading conveyors. The panel distribution system further has a control means for controlling operation of the first and second panel positioning means.

The first and second panel positioning means each includes a right pusher and a left pusher disposed on opposite sides of each of the loading conveyors for forcing the panel laterally inwardly of the upper loading conveyor, and a center stopper disposed between two adjacent loading conveyors and vertically movable between an elevated position in which the center stopper partly projects from an upper surface of the loading conveyors, and a descended position in which the center stopper is retracted from the upper surface of the loading conveyors.

The panels coming out from the transfer press are distributed selectively onto an upper loading conveyor and a lower loading conveyor, and after that the panels are loaded into the container means or baskets directly from the upper loading conveyor or the lower loading conveyor.

In the case where the panels are large in size, the center stopper is retracted from the upper surface of the loading conveyors, and one of the right and left pushers is utilized as a stopper, while the other pusher serves as a pusher for forcing the large panel against the stopper, thereby positioning the large panel.

Alternatively when the panels are small in size, the center stopper is projected from the upper surface of the loading conveyors, and the right and left pushers are operated to force a pair of small panels, respectively, against the central stopper, thereby positioning the small panels. The positioning means of this invention is well adaptable to the distribution of a single sort of panels and the distribution of two different sorts of panels, thus making it possible to increase the degree of production freedom of the panel distribution system.

Since the conveyance line extending from the transfer press and the loading conveyors are aligned with each other, the panels while being advance along such straight path are unlikely to cause postural change or misorientation and hence subsequent positioning and loading operations can be achieved with good accuracy. The widthwise dimension of the panel distribution system is much smaller than that of the conventional system having a generally T shape, as shown in FIG. 22. Accordingly, the system of this invention requires only a small floor space and can be laid out with no substantial difficulty.

The third-mentioned object of the present invention can be attained by a method of distributing panels from a transfer press into a first basket and a second basket via a panel distribution system including a two-directional delivery conveyor for delivering panels coming out from a transfer press into an upper position and a lower position, an upper loading conveyor and a lower loading conveyor contiguous to the upper position and the lower position, respectively, for transferring the panels, a plurality of the first baskets provided for the upper loading conveyor, and a plurality of the second baskets provided with the lower loading conveyor. The method comprises the steps of: determining the number of panels to be loaded from the difference between the number of panels to be produced and the number of loaded panels; making a judgment as to whether or not the number of panels to be loaded is less than a predetermined number; slowing down the production speed of the transfer press when the number of panels to be loaded is less than the predetermined number; fixing the position of the two-directional delivery conveyor, when the number of panels to be loaded is less than the predetermined number, to the upper position, thereby delivering the panels only onto the upper loading conveyor; and loading the remaining panels concentratedly into the first basket.

The panel distribution method has a unique procedure provided for the loading of a few odd panels, which is achieved with the use of the first basket along. With this loading procedure, the loading or storage efficiency of the first basket is considerably increased as compared to the conventional procedure. In this instance, the second basket remains unloaded and hence does not require transportation to a warehouse, If the first basket is filled up with the panels, a subsequent loading process will be achieved with the use of the second basket. A highly efficient use of the baskets is, therefore, possible. Furthermore, when two parallel juxtaposed loading conveyors are interlocked in operation, the production speed of the transfer press is slowed down to preclude collision between the adjacent panels, thus making it possible to achieve the loading operation smoothly and reliably.

BRIEF DESCRIPTION OF THE DRAWINGS

Certain preferred embodiment of the invention will now be described in greater detail by way of example with reference to the accompanying drawings, in which.

Figure 18:
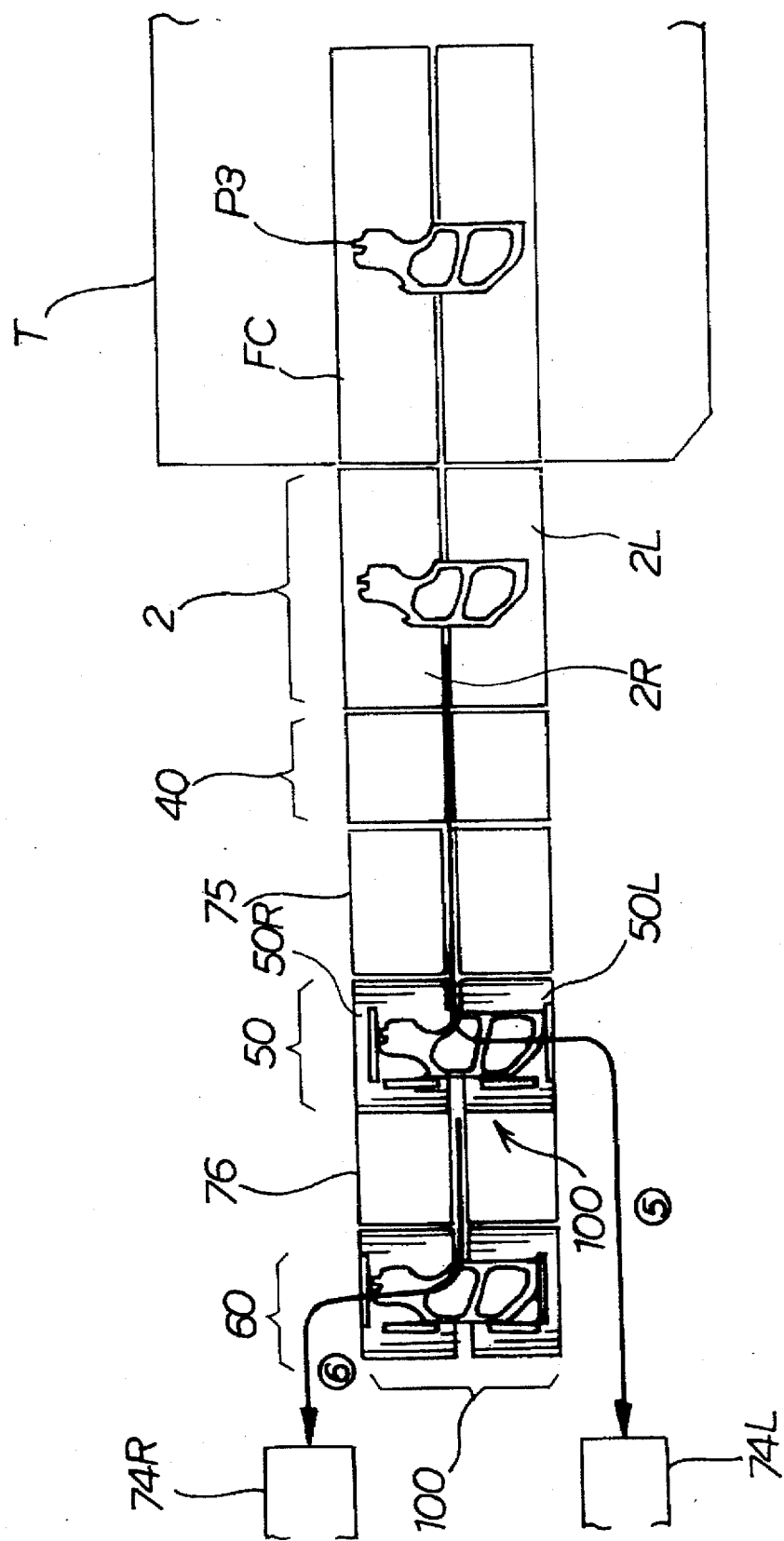
FIG. 18 is a diagrammatical view illustrative of the operation taken when large panels are dealt with on the panel distribution system of the second embodiment.
Figure 20:
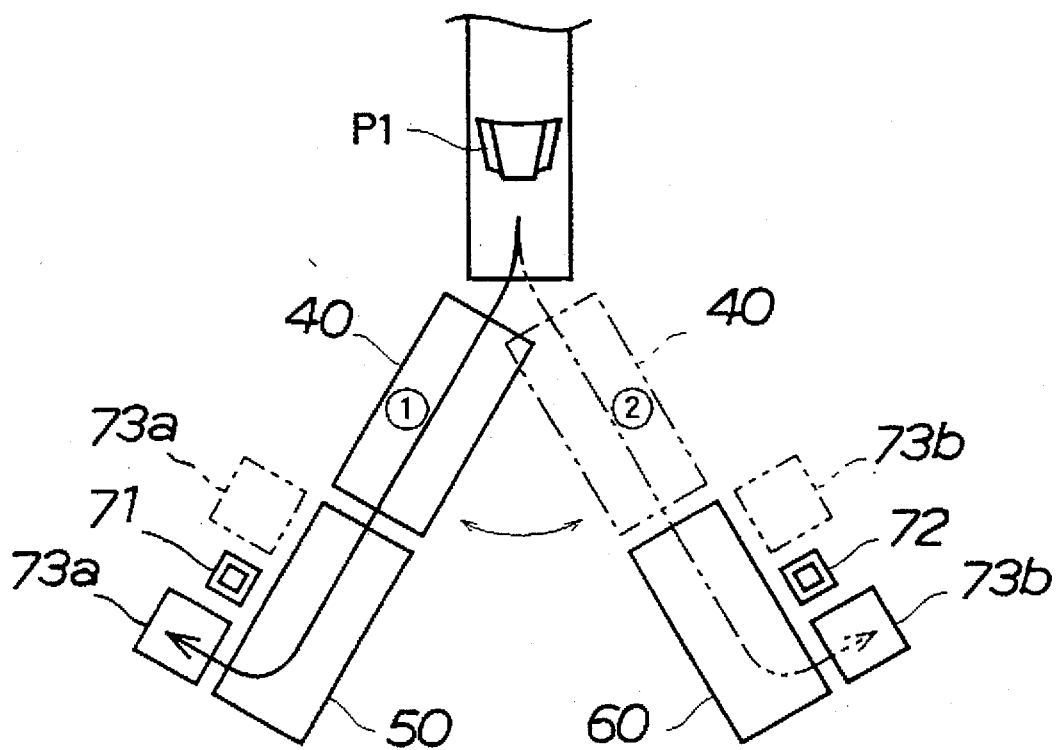
Figure 21:
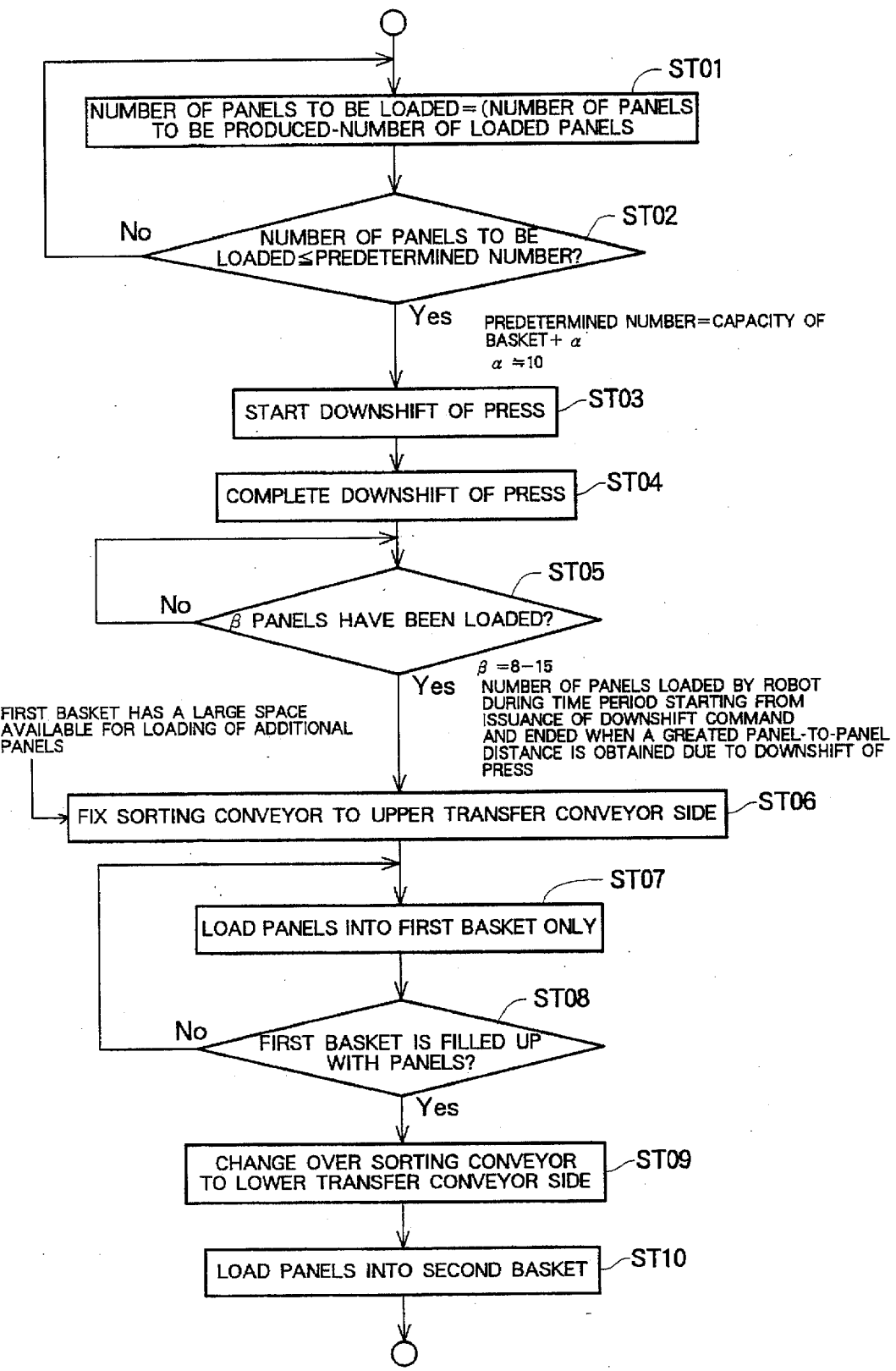
Figure 22:
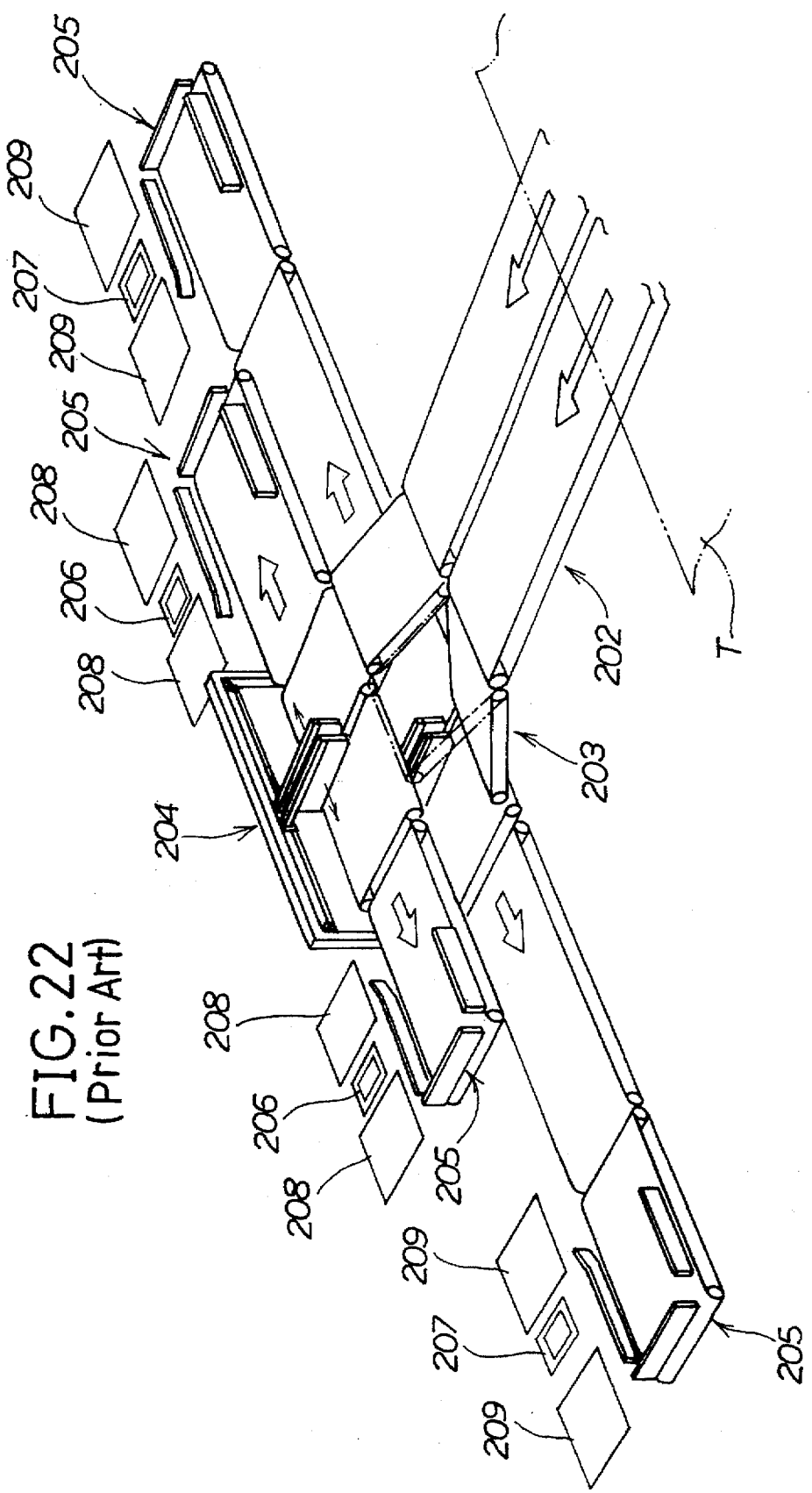
Figure 23:
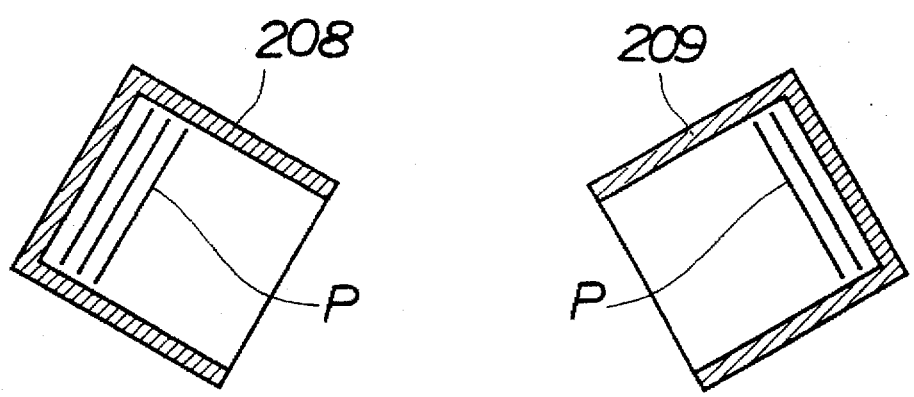

FIG, 19 is an explanatory view of a main portion of FIG. 18, showing the operation of the panel positioning means taken in combination with the large panels;

FIG. 20 is a diagrammatical plan view showing a panel distribution method according to the present invention;

FIG. 21 is a flowchart showing a sequence of operations taken in accordance with panel distribution method of the present invention;

FIG. 22 is a diagrammatical perspective view of a panel distribution system according to the prior art; and FIG. 23 is a view showing a storage condition of baskets at the end of a panel loading operation of the conventional panel distribution system.

DETAILED DESCRIPTION OF THE INVENTION

FIGS. 1 through 9 show a panel distribution system according to a first embodiment of the present invention.

Figure 1:
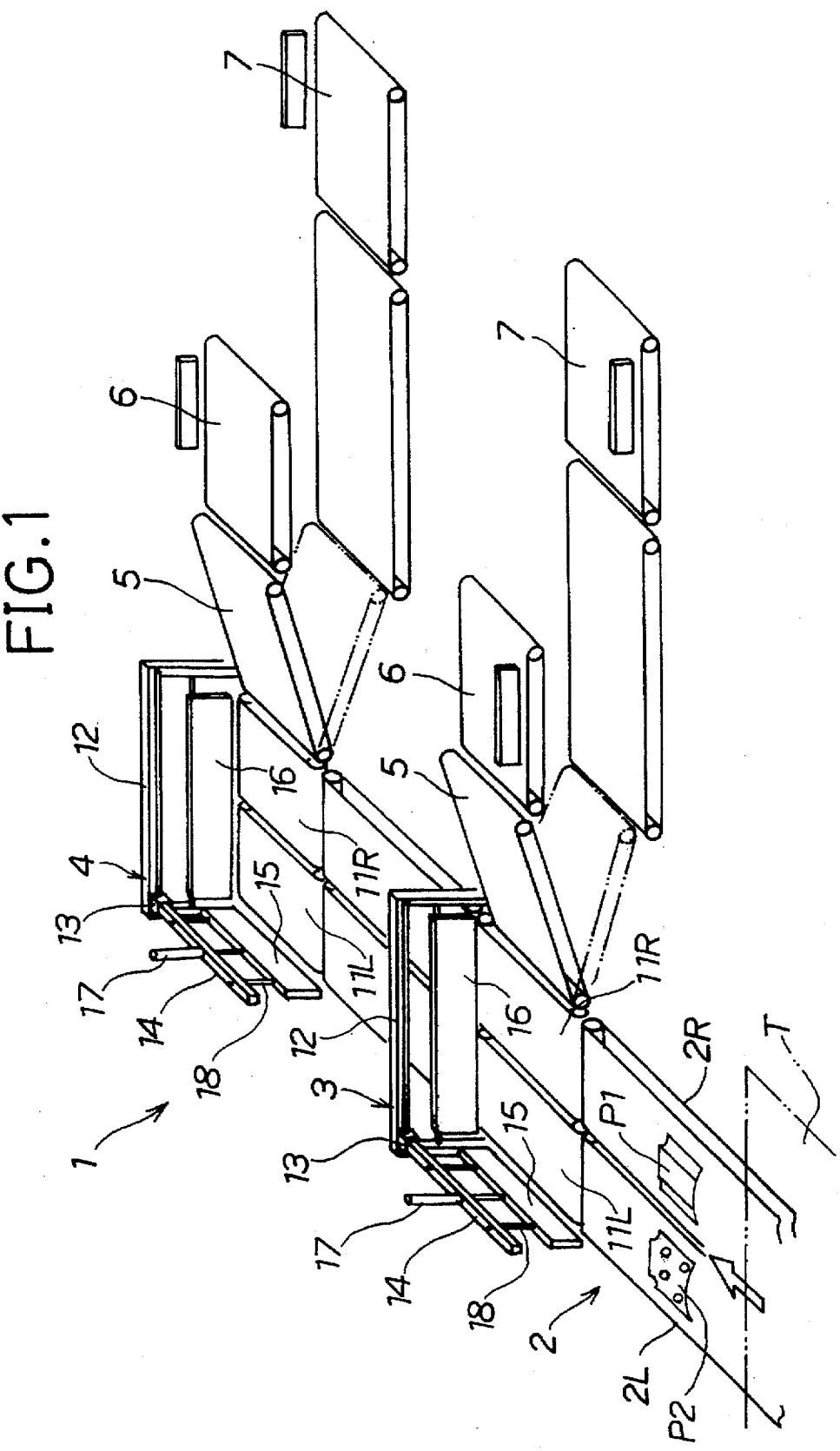
FIG. 1 is a diagrammatical perspective view of a panel distribution system according to a first embodiment of the present invention.

In FIG. 1, the panel distribution system 1 generally comprises a conveyance line 2, two delivery means or units 3, 4, two pivotally movable vertical two-directional delivering means or units 5, 5, two upper loading sections or stations 6, 6, and two lower loading sections or stations 7, 7.

The conveyance line 2 extends linearly from the delivery end (downstream end) of a transfer press T by which press-formed components such as panels constituting parts of a vehicle body are produced. The conveyance line 2 is composed of a right conveyor 2R and a left conveyor 2L arranged in parallel juxtaposition along a direction of conveyance of the panels. The conveyance line 2 is constructed such that when the panels formed by the transfer press T are composed of two sorts of small panels P1 and P2, the right and left conveyors 2R and 2L operate independently from each other to convey the small panels P1 and P2, respectively, and when the panels formed by the transfer press T are composed of large panels P3 (FIG. 8), the right and left conveyors 2R and 2L operate in interlocked or synchronized condition.

The delivery units 3 and 4 are disposed on the conveyance line 2 for forcing out the conveyed components or panels sideways or in a lateral direction from the conveyance line 2. The delivery units 3 and 4 are spaced in the longitudinal direction of the conveyance line 2, and an upstream one of the delivery units 3, 4 is so constructed as to allow the passage of the small panels P1, P2 through the upstream delivery unit 3.

The vertical two-directional delivery units 5 and 5 are disposed on one side of the upstream and downstream delivery units 3 and 4, respectively, for switching or changing over the direction of conveyance of the panels delivered from the delivery units 3, 4 between an upward direction and a downward direction. The vertical two-directional delivery units 5, 5 are each composed of a pivotally movable conveyor. At the possible delivery ends of each of the vertical two-directional delivery units 5, 5, one of the upper loading stations 6, 6 and a corresponding one of the lower loading stations 7, 7 are disposed in overlapping or two-storied condition for the loading of the panels. Two of such overlapping upper and lower loading stations 6, 7 are arranged side by side.

Figure 2:
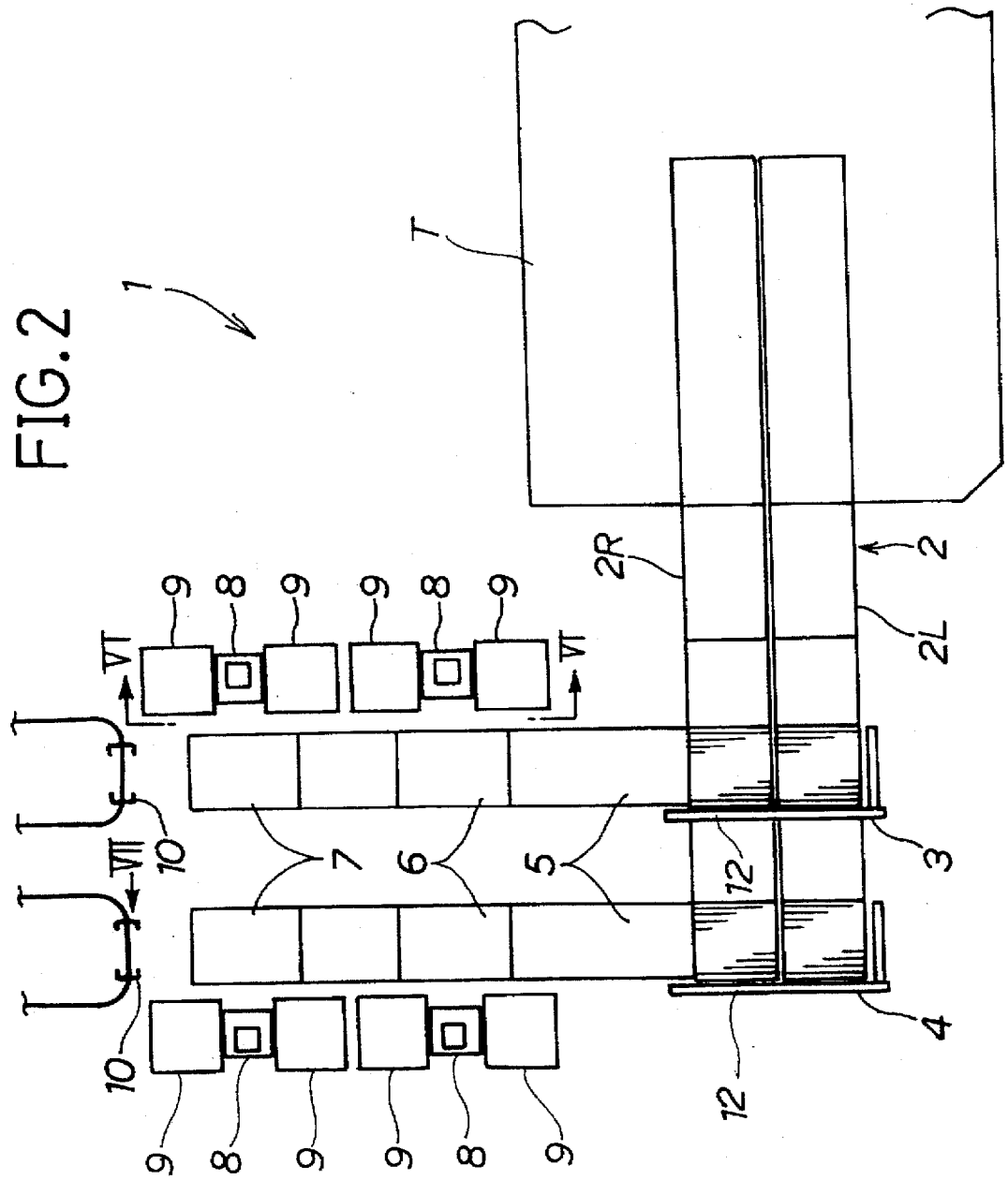
FIG. 2 is a plan view of the panel distribution system.

As shown in FIG. 2, one pair of upper and lower stations composed of conveyors 6, 7 and the other pair of upper and lower transfer stations composed of conveyors 6, 7 extend in a common lateral direction from the upstream delivery unit 3 and the downstream delivery unit 4, respectively, so that the panel distribution system 1 has a generally F shape in the plan view or as viewed from the above. The panel distribution system 1 further includes a pair of loading robots 8 disposed on one side of each pair of upper and lower loading conveyors 6, 7 for transferring the panels from the respective loading conveyors 6, 7 to container members or baskets 9, 9 associated in pairs with each of the loading robots 8. Two overhead hangers 10, 10 are disposed adjacent to the trailing ends of the lower loading conveyors 7, 7.

Figure 3:
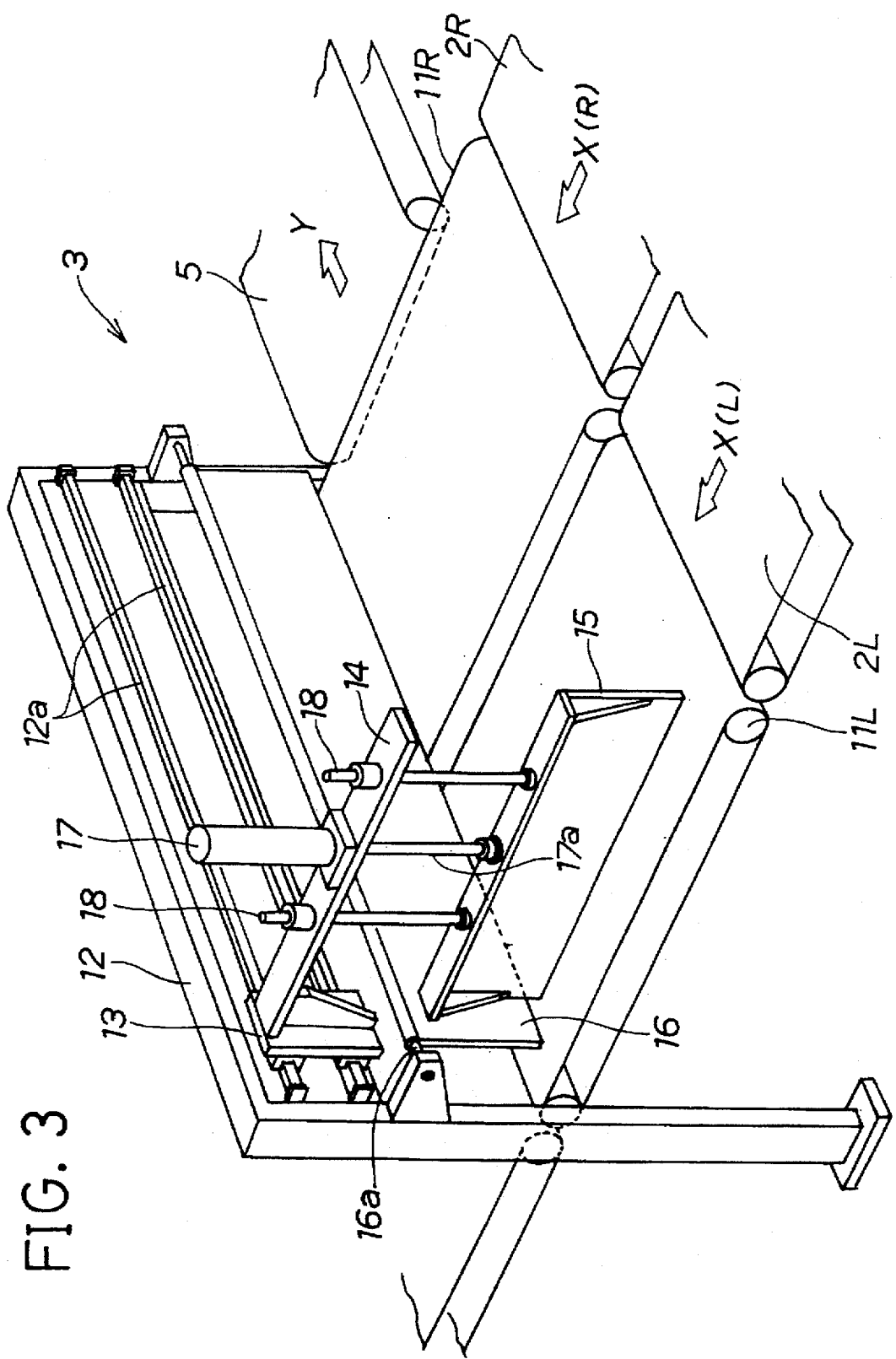
FIG. 3 is a detailed perspective view showing a delivery means of the panel distribution system.

FIG. 3 shows in details the upstream delivery unit 3 of the present invention. The upstream delivery unit 3 includes parallel juxtaposed right and left steel belt conveyors 11R, 11L, a rectangular gate-like frame 12 disposed downstream of the steel belt conveyors 11R, 11L for the passage therethrough of the panel, two parallel spaced horizontal guide rails 12a, 12a extending across the width of the frame 12, a slide member 13 slidable along the guide rails 12a, 12a, an elongated horizontal support member 14 projecting from an upper end of the slide member 13 toward the conveyors 11R, 11L, a delivery plate 15 vertically movably mounted on the support member 14, and a stopper 16 for opening and closing the conveyance line 2.

The support member 14 has a longitudinal central portion to which a vertical cylinder 17 is secured for lifting up and down the delivery plate 15. The cylinder 17 has a cylinder rod 17a connected at its outer end to the delivery plate 15. The cylinder 17 has a stroke which is large enough to move the delivery plate 15 upwardly to a position freed from interference with the press-formed panel. Reference numerals 18, 18 denote guide bars firmly secured at their lower end to the delivery plate 15 and slidably supported at their upper end portion by the support member 14, so as to transmit a delivering force to the delivery plate 15 while vertically and slidably guiding the delivery plate 15. The delivery plate 15, when used for delivering the panels in the right-hand direction relative to the panel conveyance direction, is normally held in a standby position located outside the left side edge of the left conveyor 11L. The stopper 16 is supported on a horizontal support shaft 16a extending across the width of the frame 12 and pivotally movable between a closing position in which the stopper 16 closes the conveyance line 2, and an open position in which the stopper 16 opens the conveyance line 2. The pivotal movement of the stopper 16 is caused by an electric opening and closing control.

Figure 4:
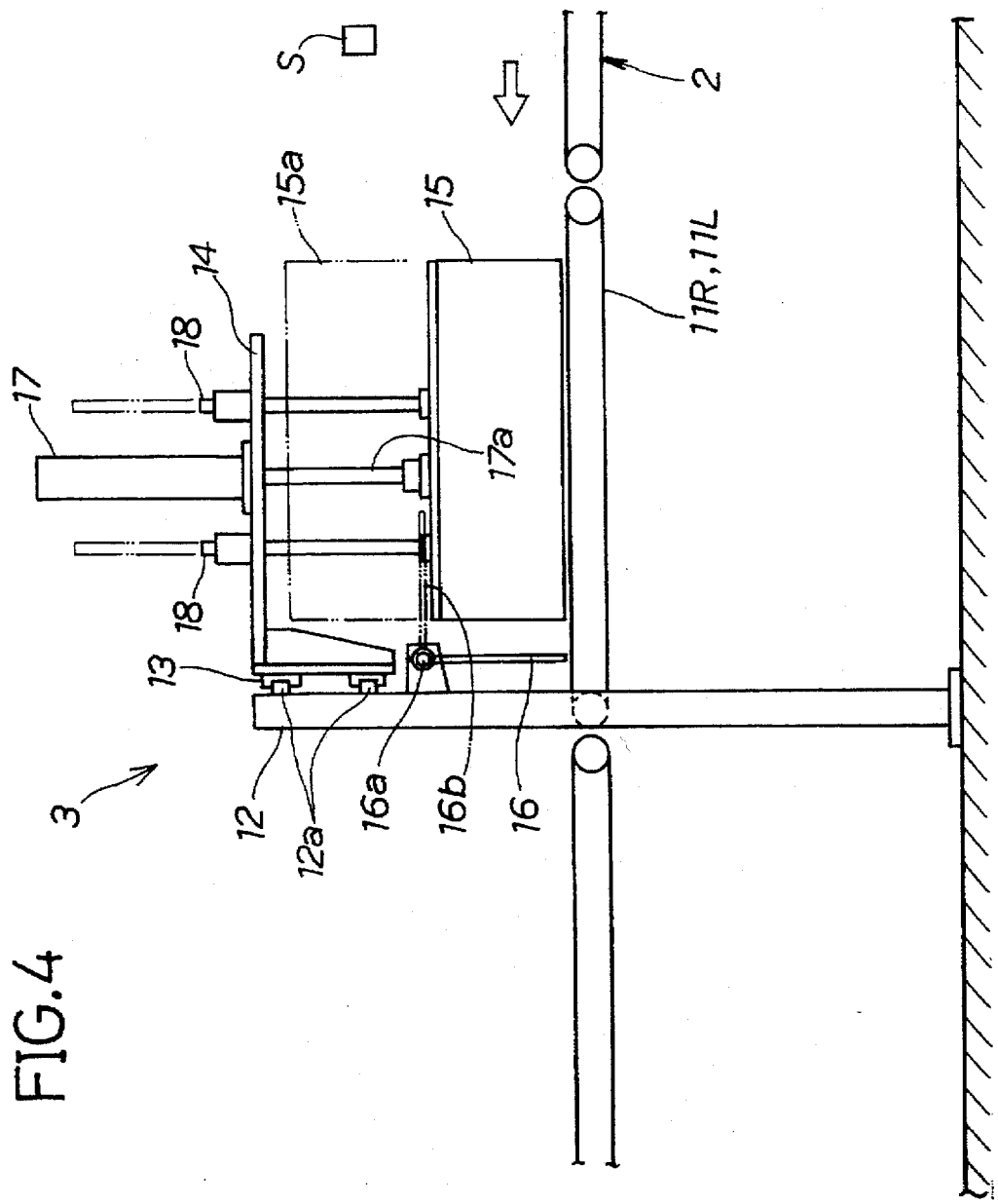
FIG. 4 is a side view illustrative of the operation of the delivery means.

FIG. 4 is a side view illustrative of the operation of the upstream delivery unit 3 of the present invention. The delivery plate 15 is normally standing by at a position outside the left side of the conveyance line 1 and held in a descended condition. In response to the detection of a panel by a panel detecting sensor S, the stopper 16 is brought into a closed condition, so that the panels advancing into the conveyors 11R, 11L are stopped by the stopper 16. Then the slide member 13 undertakes its sliding action to force out or deliver the panels in the right-hand direction with respect to the panel conveyance direction. Upon completion of the panel delivering operation, the cylinder 17 is activated to move the delivery plate 15 upwardly to the position indicated by the phantom lines shown in FIG. 4, and then the delivery plate 15 is returned to the standby position during which time the delivery plate 15 passes over and across the next following panels. The stopper 16 is turned upwardly to the open position 16b indicated by the phantom lines shown in FIG. 4 so that the panels are able to move through the upstream delivery unit 3.

The upstream delivery unit 3 undertakes its delivery action selectively when every other panel or every other panel pair moves into the delivery position on the delivery unit 3. With this delivery action, half the number of the panels is delivered by the upstream delivery unit 3, and the other half of the panels is allowed to pass through the upstream delivery unit 3. If one of two rows of panels on the conveyance line 2 is detected by the sensor S, half the number of the panels are delivered and the rest of the panels is allowed to pass through the delivery unit 3 even when the conveyance lines for the small panels P1 and P1 are used alternately. The stopper 16 may be separated into two parts each provided for one of the right and left conveyors 11R and 11L and adapted to be opened and closed independently. In this case, a row of panels on each conveyor 11R or 11L can be selectively delivered in combination with opening and closing operation of a corresponding one of the stoppers. The stopper 16 may be constructed to achieve its opening and closing operation via a vertical reciprocating motion rather than the pivotal motion, in which instance the same operational performance as described above can be attained.

The downstream delivery unit 4 shown in FIG. 1 has the same structure as the upstream delivery unit 3 described above with the exception that the stopper 16 is fixed in the closed position. With this structural similarity, further description of structural details of the downstream delivery unit 4 will be omitted. The downstream delivery unit 4 may have the identical construction as the upstream delivery unit 3 in which instance the delivery action will be taken in the same manner as described above excepting the control of opening and closing operation of the stopper 16 of the downstream delivery unit 4.

Figure 5:
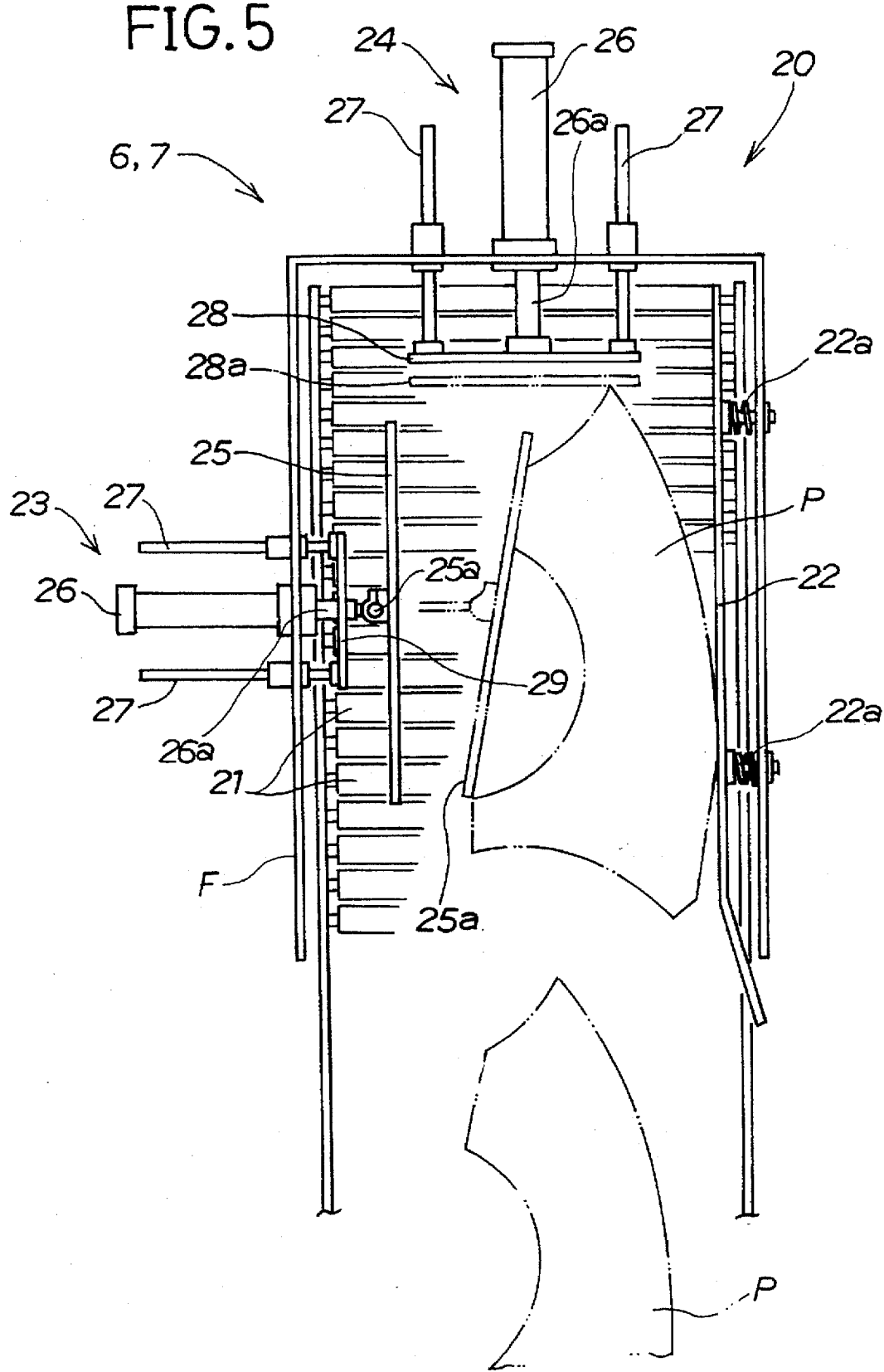
FIG. 5 is a detailed plan view showing a panel positioning means associated with a loading conveyor of the panel distribution system.

FIG. 5 illustrates a detail of the upper and lower loading conveyors 6, 7. The loading conveyors 6, 7 each have a positioning mechanism 20 composed of a roller section or unit 21 including a large number of rollers for receiving thereon the panels being conveyed, an elongated positioning plate 22 resiliently supported on one side of the roller unit 21 via a plurality of coil springs 22a and having a guide, a side pusher 23 disposed on the other side of the roller unit 21 in confronting relation to the positioning plate 22, and an end pusher 24 disposed at a downstream end of the roller unit 21.

The side pusher is composed of a pivotally movable pusher plate 25, a cylinder 26 for advancing and retracting the pusher plate 25, and a pair of guide bars 27, 27.

The cylinder 26 is mounted on one side of a rectangular frame F extending in such a manner as to surrounding the sides and the downstream end of the roller unit 21. The cylinder 26 has a cylinder rod 26a attached to a support plate 29 at a portion near the outer end to which the pusher plate 25 is pivotally connected via a vertical shaft 25a. The guide bars 27, 27 are fixedly connected at one end to the support plate 29 and slidably supported on a side remote from the fixed end by the rectangular frame F.

The end pusher 24 has the same structure as the side pusher 23 excepting that the pusher plate is a fixed pusher plate 28 instead of the pivotally movable pusher plate 25.

In operation of the side pusher 23, the cylinder 26 is activated to advance the pivotally movable pusher plate 25 to the position indicated by the phantom lines shown in FIG. 5, thereby forcing the panel P against the positioning plate 22 to set the position of the panel P relative to the side of the roller unit 21. By virtue of a combination of the pivotally movable pusher plate 25 and the resiliently supported positioning plate 22, the panel P can be positioned in a stable condition even when the panel P has a complicated configuration. The end pusher 24 advances the fixed pusher plate 28 to the phantom-lined position by the advancing action of the cylinder 26, thereby positioning the front end of the panel P. The panel P is positioned at a fixed position by the side pusher 23 and the end pusher 24, a transferring operation by the loading robots 5 can be achieved smoothly and accurately.

Figure 6:
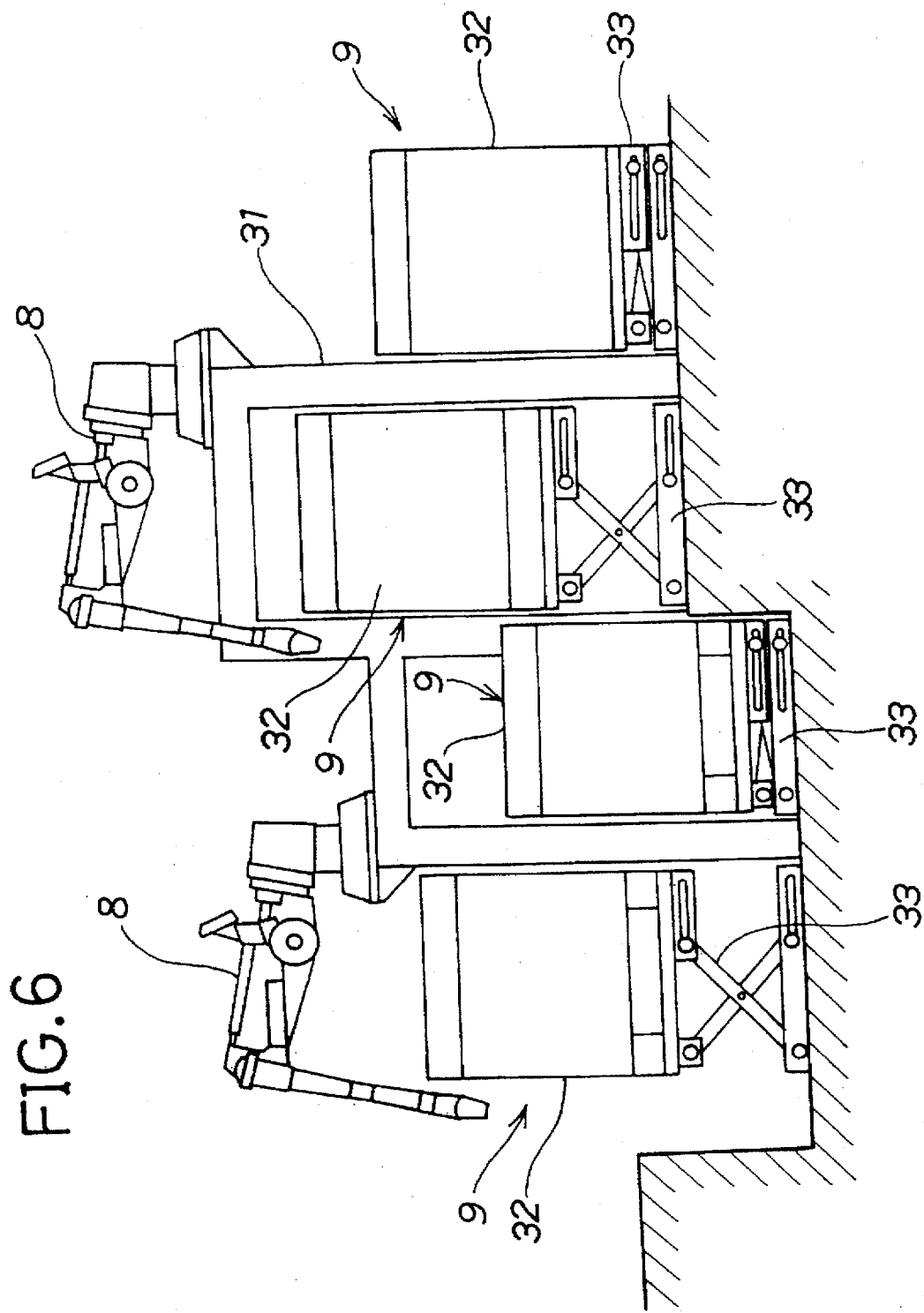
FIG. 6 is a detailed view of loading robots and baskets as taken in the direction along the line VI—VI of FIG. 2.

FIG. 6 is a detailed view in the direction along the line VI—VI of FIG. 2, showing loading means.

In FIG. 6, the loading robots 8, 8 each have a body fixedly mounted on a frame 31. One pair of baskets 32, 32 is disposed on opposite sides of each of the robots 8, 8 for storing therein the panels in a stacked condition. The baskets 32, 32 each have a pantograph lift 33 connected to the bottom of the corresponding basket 32. The baskets 32, 32 thus supported by the pantograph lifts 33, 33 are vertically movable up and down. Each of the baskets 32 and a corresponding one of the lifts 33 jointly constitute a container means 9 for receiving therein the panels. Two of such container means 9 are used in a pair. When one container means 9 is filled up with the panels, the other container means 9 is used in place of the filled container. By using two container means 9, 9 alternately, the panels can be received in either container means 9 without interruption.

The loading robots 8, 8 and the associated pairs of container means 9, 9 are disposed concentratedly on the proximity of the upper loading conveyors 6, 6 and the lower loading conveyors 7, 7, so that the floor space can be used efficiently with considerable reductions of dead space.

Figure 7:
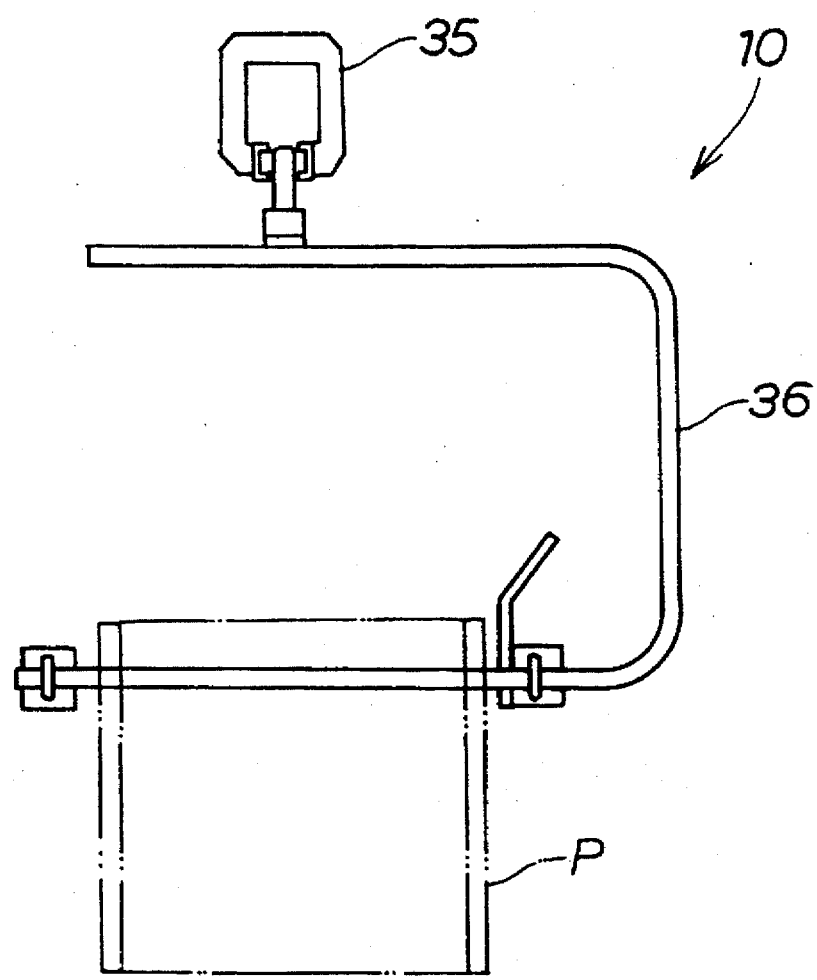
FIG. 7 is a detailed view of a vertical two-directional delivery conveyor in the direction of the arrow VII in FIG. 2.

FIG. 7 illustrates a detail of the overhead hanger 10 as viewed in the direction of the arrow VII in FIG. 2. The overhead hanger 10 includes a trolley conveyor 35 and a number of fork-like support arms 36 (one being shown) suspended from the trolley conveyor 35. A panel P is hung on the support arm 36 and then conveyed by the trolley conveyor 35 to a storage section (not shown) so that the panels P can be stored in the storage section without the regard to the shape and size of the panels P.

The trolley conveyor 35 is disposed adjacent to the downstream end of each of the lower loading conveyors 7, 7 and extends in a looped pattern. The panels P are transferred by the robots 8 from the lower loading conveyors 7, 7 to the individual support arms 36 of the corresponding overhead hangers 10 and then conveyed in succession by the trolley conveyors 35.

Two modes of operation of the panel distribution system of the foregoing construction taken to carry out the conveyance and loading of large P3 and small panels P1 and P2 of different shapes, respectively, will be described below in the order named.

Figure 8:
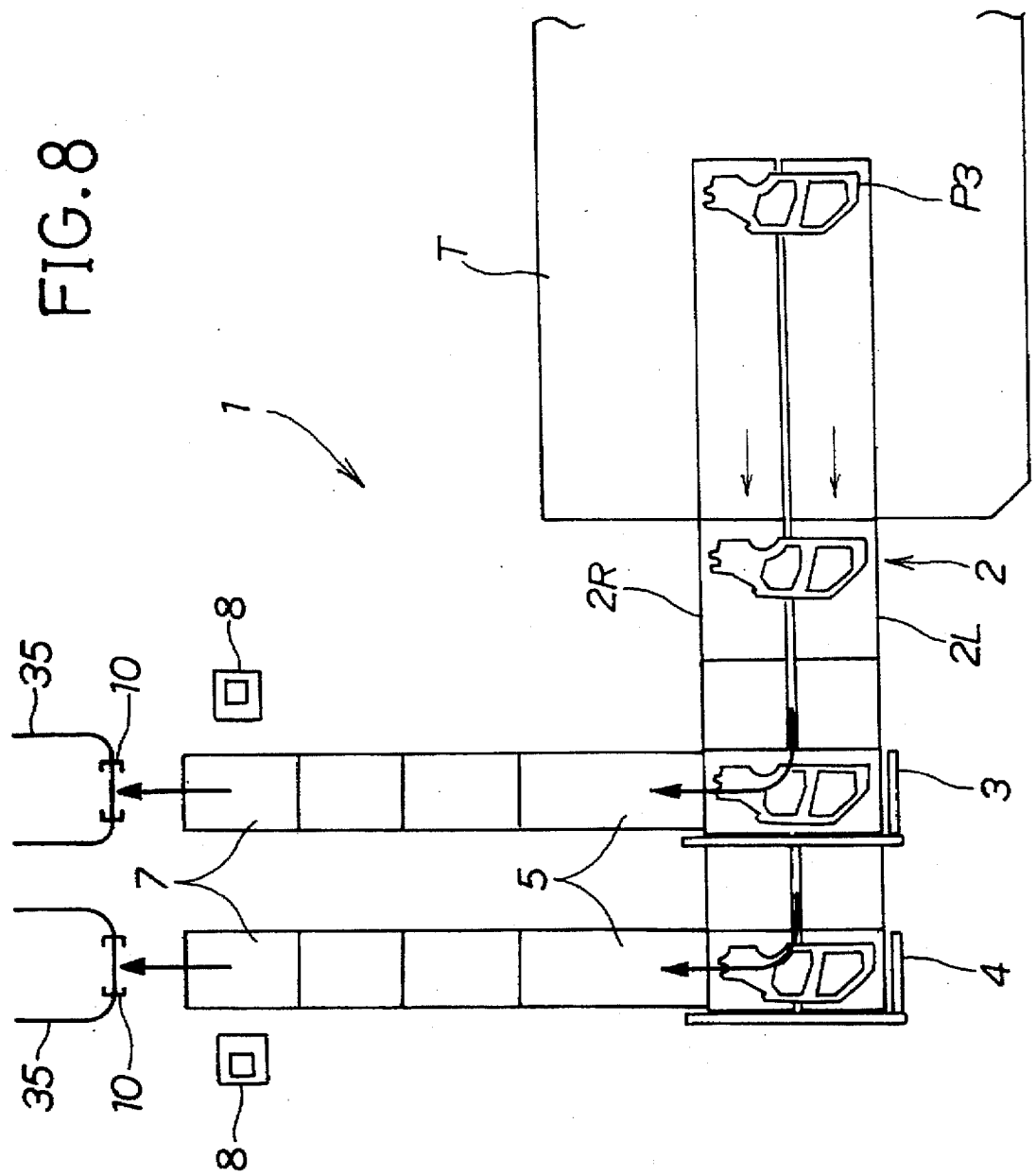
FIG. 8 is a diagrammatical plan view explanatory of a manner taken for the distributive conveyance of large panels.

FIG. 8 diagrammatically illustrates one operation mode of the panel distribution system taken to convey and load the press-formed large panels P3. The large panels P3 press-formed on the transfer press T are conveyed along the conveyance line 2 while they are placed astride the right and left conveyors 2R, 2L In this instance, the right and left conveyors 2R and 2L run in an interlocked or synchronized condition. The large panels P3 while being conveyed by the conveyance line 2 arrive one after another at the upstream delivery unit 3 whereupon the delivery unit 3 is operated to undertake its delivery action only in response to the arrival of every other large panel P3. Accordingly, half the number of the large panels P3 is delivered from the upstream delivery unit 3, the other half of the panels P3 passes through the upstream delivery unit 3 and reaches the downstream delivery unit 4 where the panels P3 are delivered by the downstream delivery unit 4.

The large panels P3 delivered from each of the delivery units 3, 4 are supplied by the associated vertical two-directional delivery unit 5 onto the lower loading conveyor 7 from which the large panels P are transferred to the corresponding overhead hanger 10 by the robot 8 disposed adjacent to the downstream end of the lower loading conveyor 7.

Figure 9:
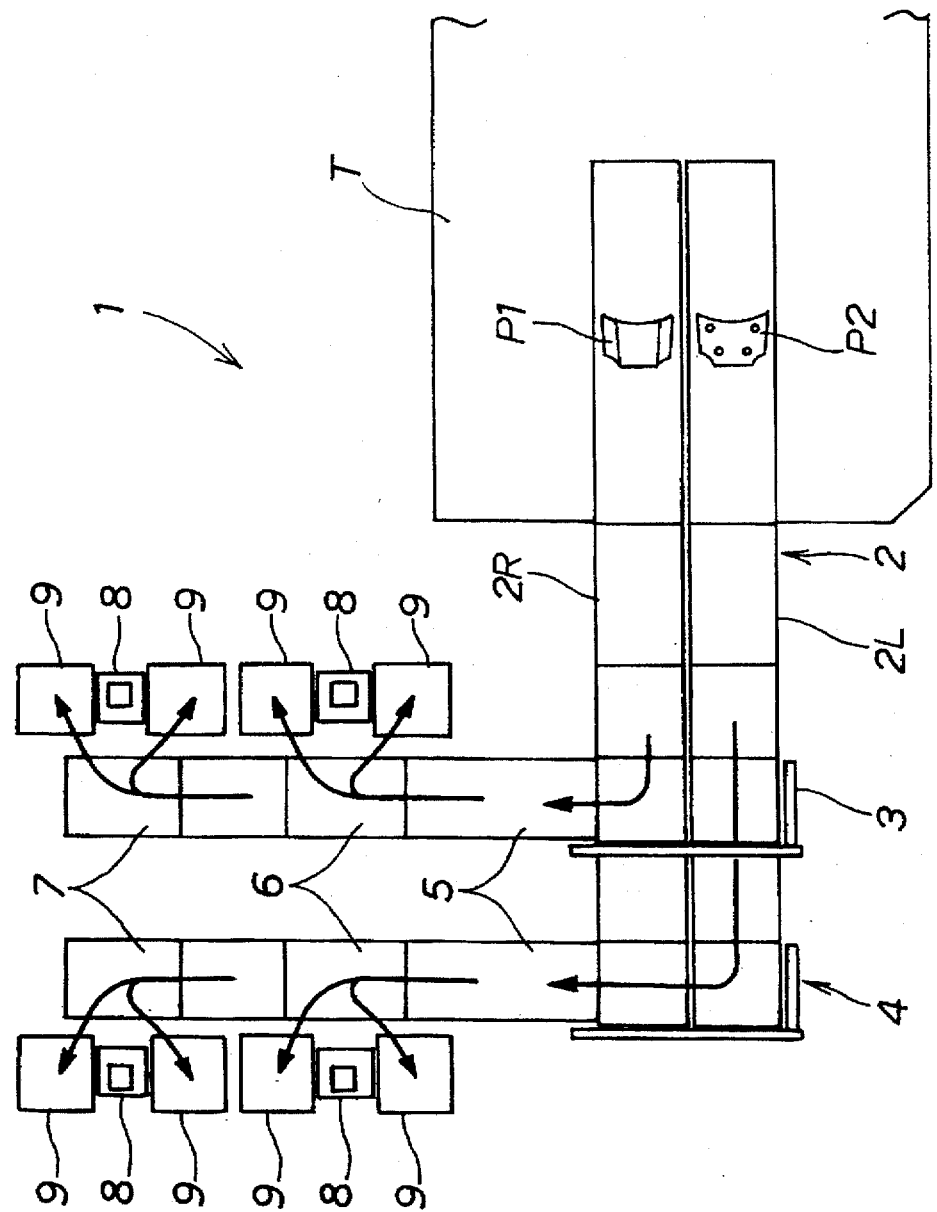
FIG. 9 is a diagrammatical plan view illustrative of the manner in which small panels are distributed along left and right conveyors.

FIG. 9 diagrammatically illustrates another operation mode of the panel distribution system taken to convey and load the press-formed small panels P1 and P2. The small panels P1 are formed on a right-hand working line on the transfer press T as viewed from the panel conveyance direction, while the small panels P2 are formed on a left-hand working line on the transfer press T as viewed from the panel conveyance direction. In this instance, if the upstream delivery unit 3 is so controlled as to deliver the small panels P1 one at a time in response to an output from the sensor S (see FIG. 4) issued when the sensor S detects each of the small panels P1, all the small panels P1 are delivered into the vertical two-directional delivery unit 5 associated with this upstream delivery unit 3. On the other hand, all of the small panels P2 pass through the upstream delivery unit 3 and arrive one after another at the downstream delivery unit 4 which in turn delivers the small panels P2 into the vertical two-directional delivery unit 5 associated with this downstream delivery unit 4. Thus, half the number of small panels P1 and P2 is delivered from each of the upstream and downstream delivery units 3 and 4 in a neatly sorted condition according to the position of the small panels P1, P2 relative to the conveyance line 2.

The small panels P1, P2 sent out from each of the delivery units 3, 4 are supplied via the associated vertical two-directional delivery conveyor 5 onto the upper loading conveyor 6 or the lower loading conveyor 7 from which the small panels P1, P2 are loaded into the basket 9 by the loading robot 8.

Irrespective of the position of the small panels P1 and P2 with respect to the conveyance line 2, the upstream delivery unit 3 may be selectively operated to deliver half the number of the small panels P1 while allowing the other half of the small panels P1 to pass through the upstream delivery unit 3 in the same manner as done in the case of conveyance and loading of the large panels P3 described above.

As described above, since the panel distribution system 1 according to the first embodiment of the present invention includes a plurality of loading conveyors 6, 7 arranged on and connected with the same side of the conveyance line 2, a floor area or space occupied by the entire system 1 is much smaller than the floor space of the conventional panel distribution system in which loading sections or stations are arranged on the opposite sides of the conveyance line, as shown in FIG. 22.

In the embodiment described above, a single conveyance line 2 is provided with two delivery units 3, 4 at different positions, and a pair of upper and lower loading conveyors 6, 7 is associated with each of the delivery units 3, 4 so that the panel distribution system 1 has a generally F shape as viewed from the above or in the plan view. As an alternative, three or more delivery units may be provided in which instance the panel distribution system has a comb-like shape in the plan view. All but one at the downstream end of the conveyance line are constructed to allow the passage of panels by the action of the movable stoppers.

Figure 10:
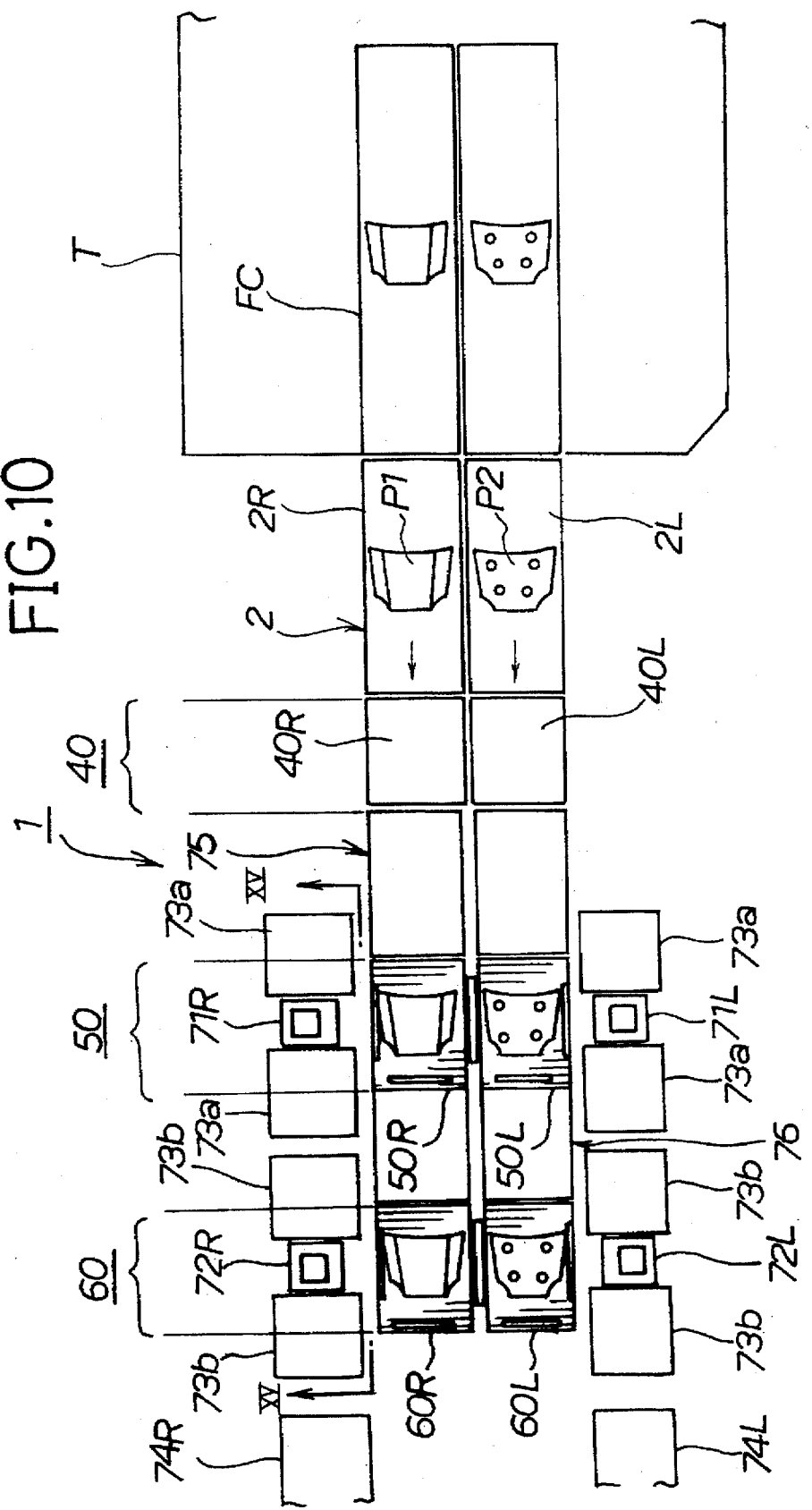
FIG. 10 is a diagrammatical plan view of a panel distribution system according to a second embodiment of the present invention.

FIGS. 10 through 19 illustrate a panel distribution system according to a second embodiment of the present invention. In FIG. 10, the panel distribution system 1 generally comprises a vertical two-directional delivery conveyor 40 for delivering the panels P1 and P2 coming from a final conveyor FC of a transfer press T via right and left conveyors 2R and 2L of a conveyance line 2, selectively to an upper loading conveyor 50 and a lower loading conveyor 60 that are extending in overlapping or two-storied condition from upper and lower delivery ends or destinations of the two-directional delivery conveyor 40, and a panel positioning means or unit 100 (see FIG. 13) associated with each of the upper and lower loading conveyors 50, 60.

The right and left conveyors 2R, 2L serve as inspection conveyors for enabling an operator to carry out a visual inspection of the press-formed panels P1, P2 while the panels P1, P2 sent out from the transfer press T are advancing on the conveyors 2R, 2L.

Each of the conveyors 40, 50, 60 may be of the single-track type, or alternatively of the double-track type as shown in the illustrated embodiment. The double track conveyors 40, 50, 60 are preferable because of a wider conveyance area available and a higher degree of freedom in operation in which the right and left conveyors operate either independently or in unison.

On the opposite sides of the upper loading conveyor 50 are disposed two upper loading robots 71R and 71L. Similarly, two lower loading robots 72R and 72L are disposed on opposite sides of the lower loading conveyor 50. The loading robots 71R, 71L, 72R, 72L have the same working envelope within which a pair of baskets 73a and 73a; 73b and 73b is disposed on opposite sides of each loading robot 71R, 71L, 72R, 72L. Thus, a total of four loading robots and a total of eight baskets are provided. On the respective outlet sides of the right and left lower loading conveyors 60R and 60L, a pair of overhead conveyors 74R and 74L are provided.

Figure 11:
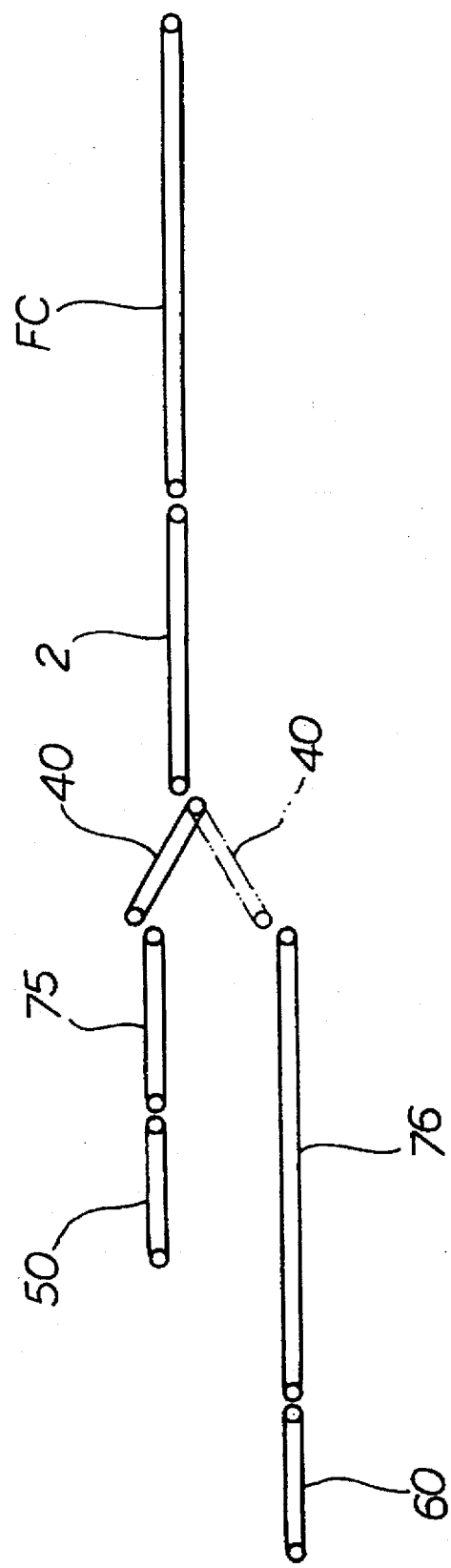
FIG. 11 is a schematic side view showing a conveyor group of the present invention.

The panel distribution system 1 has two identical right and left conveyor groups only one of which is schematically illustrated in FIG. 11. Each conveyor group is composed of the final conveyor FC, the inspection transfer conveyor 2, the vertical two-directional delivery conveyor 40, an upper intermediate conveyor 75, the upper loading conveyor 50, a lower intermediate conveyor 76 and the lower loading conveyor 60.

Figure 12:
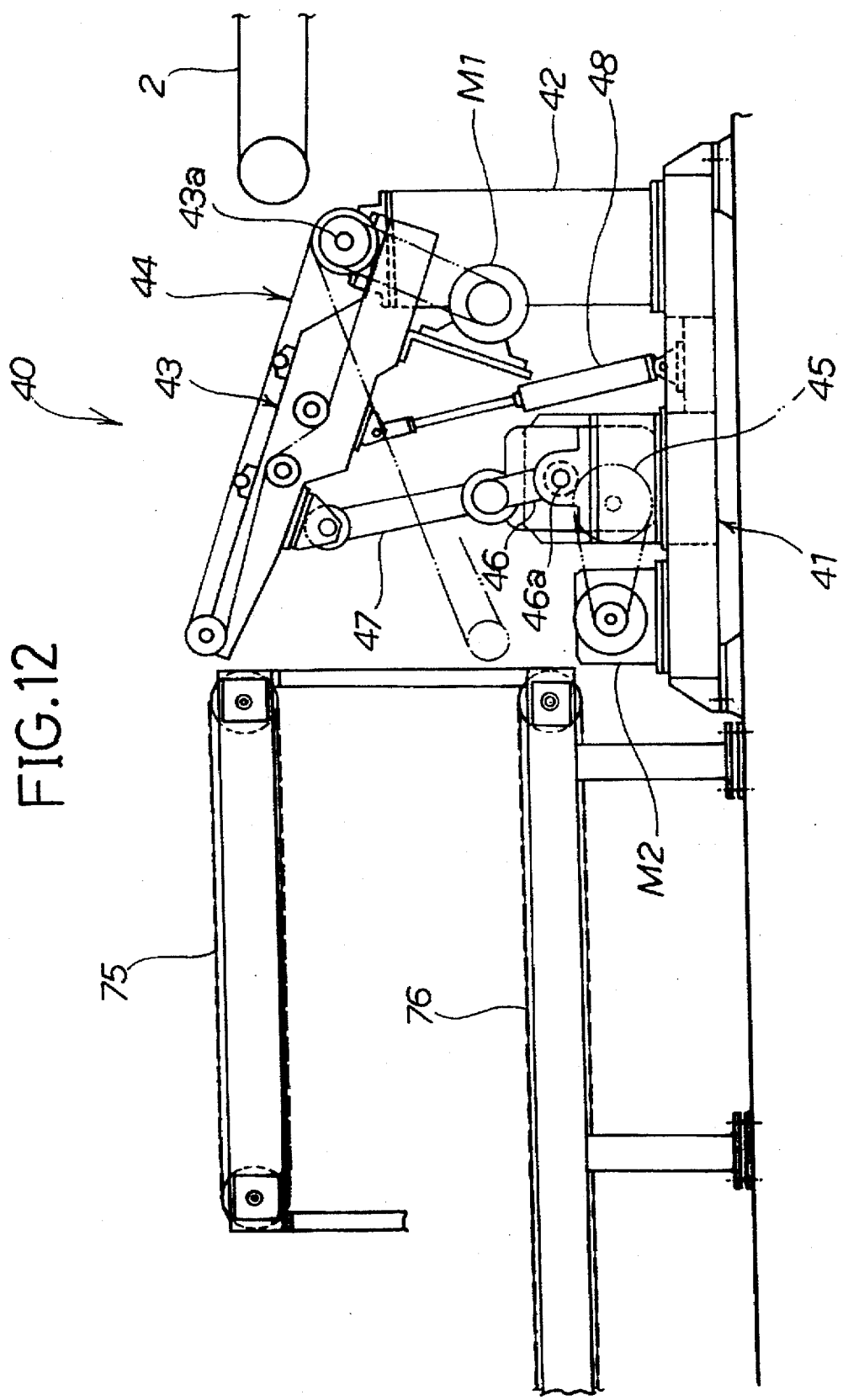
FIG. 12 is a side view showing a detail of a vertical two-directional delivery conveyor.

FIG. 12 is a detailed side view of the vertical two-directional delivery conveyor 40. The vertical two-directional delivery conveyor 40 includes a base 41 anchored to the foundation of a building, a post 42 upstanding from the base 41, a pivot beam 43 pivotally mounted on the post 42 via a horizontal shaft 43a and hence vertically pivotable about the shaft 43a, an endless rubber belt 44 running around the pivot beam 43, and a motor M1 for driving the rubber belt 44 around the pivot beam 43. The base 41 further supports thereon a motor M2 for oscillating the pivot beam 43 up and down, a gear set 45 and a crank 46. The crank 46 is rotatable about a horizontal shaft 46a to oscillate the pivot beam 43 in a vertical plane via an connecting plate or link 47. Designated by 48 is a balancer provided for normally urging the pivot beam 43 upwardly to equilibrate the loads on the oscillating motor M2.

The oscillating motor M2 is driven by a command from a control unit or controller (described later) so that the pivot beam 43 is pivoted selectively to a first position in which the delivery end (downstream end) of the two-directional delivery conveyor 40 is located in front of an upstream end of the upper intermediate conveyor 75 disposed upstream of the upper loading conveyor 50, or to a second position in which the delivery end of the two-directional delivery conveyor 40 is located in front of an upstream end of the lower intermediate conveyor 76 disposed upstream of the lower loading conveyor 60.

Figure 13:
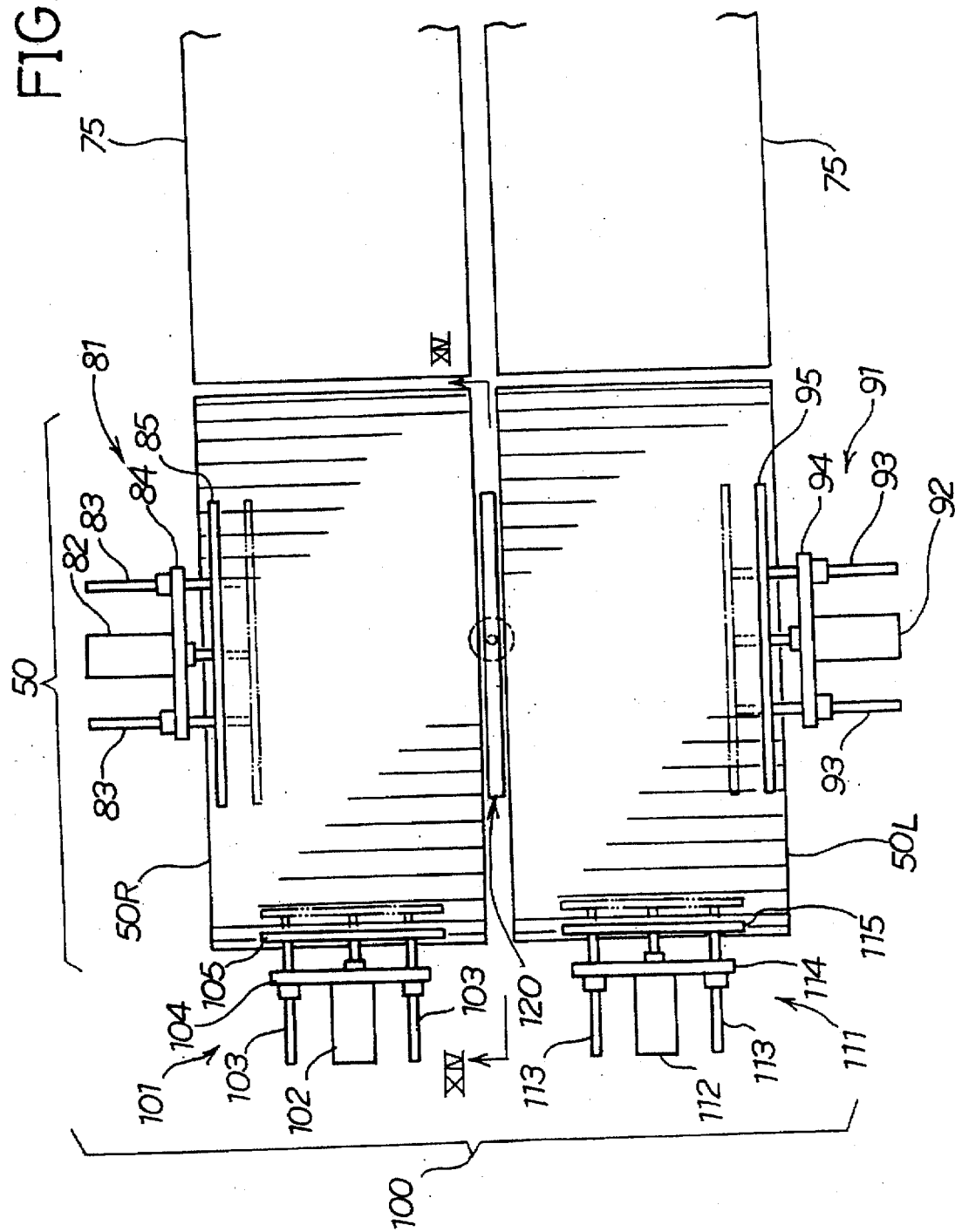
FIG. 13 is a plan view of upper loading conveyors equipped with a panel positioning means.

FIG. 13 illustrates in plane view a detail of the upper loading conveyor 50 equipped with the panel positioning means 100.

The panel positioning means 100 generally comprises a right pusher 81 disposed on the right side of the right loading conveyor 50R as viewed from the panel conveyance direction, a left pusher 91 disposed on the left side of the left loading conveyor 50L, a right end pusher 101 disposed on the downstream end of the right loading conveyor 50R, a left end pusher 111 disposed on the downstream end of the left loading conveyor 50L, and a center stopper 120 vertically movably disposed between the right loading conveyor 50R and the left loading conveyor 50L.

The right pusher 81 is composed of a right cylinder 82, a pair of guide bars 83, 83, a fixed support plate 84, and an elongated right contact bar 85. The right contact bar 85 is movable back and forth via the guide bars 83, 83 in response to the operation of the right cylinder 82.

Similarly, the left pusher 91 is composed of a left cylinder 92, a pair of guide bars 93, 93, a fixed support plate 94, and an elongated left contact bar 95. The left contact bar 95 is movable back and forth via the guide bars 93, 93 in response to the operation of the left cylinder 92.

The right end pusher 101 is composed of a right front cylinder 102, a pair of guide bars 103, 103, a fixed support plate 104, and an elongated right front contact bar 105. The right front contact bar 105 is movable back and forth via the guide bars 103, 103 in response to the operation of the right front cylinder 82.

Similarly, the left end pusher 111 is composed of a left front cylinder 112, a pair of guide bars 113, 113, a fixed support plate 114, and an elongated left front contact bar 115. The left front contact bar 115 is movable back and forth via the guide bars 113, 113 in response to the operation of the left front cylinder 112.

The panel positioning means 100 of the foregoing construction is also provided with the lower loading conveyor 60. Due to the same structure as described above with reference to FIG. 13, further description of such panel positioning means may be omitted.

Figure 14:
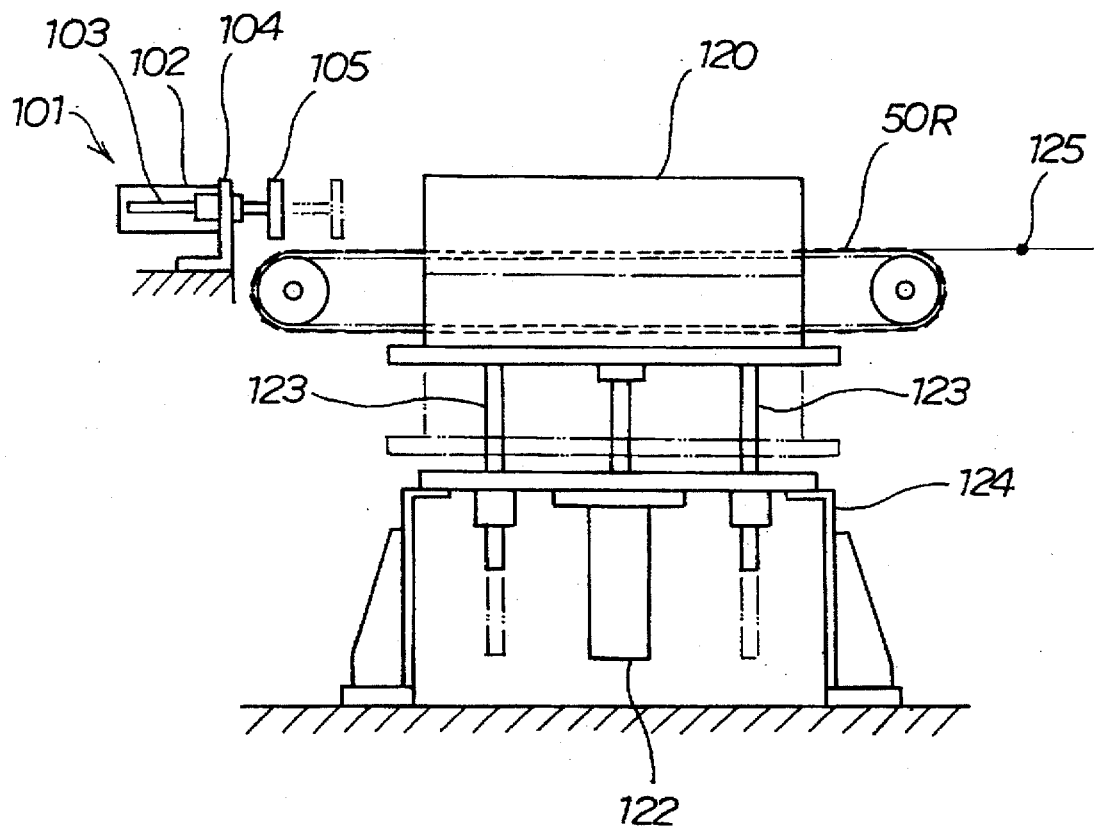
FIG. 14 is a detailed view of a lift-type center stopper as taken in the direction along the line XIV—XIV of FIG. 13.

FIG. 14 shows in detail a structure of the vertically movable center stopper 120. The center stopper 120 is supported by a vertical lift cylinder 122, a pair of vertical guide bars 123, 123 and a fixed support member 124. In response to the operation of the vertical lift cylinder 122, the center stopper 120 are vertically movable via the guide bars 123, 123 between an elevated position in which the center stopper 120 projects upwardly from a path line 125 defined by an upper surface of the right loading conveyor 50R, and a descended position in which the center stopper 120 is retracted downwardly away from the path line 125.

Figure 15:
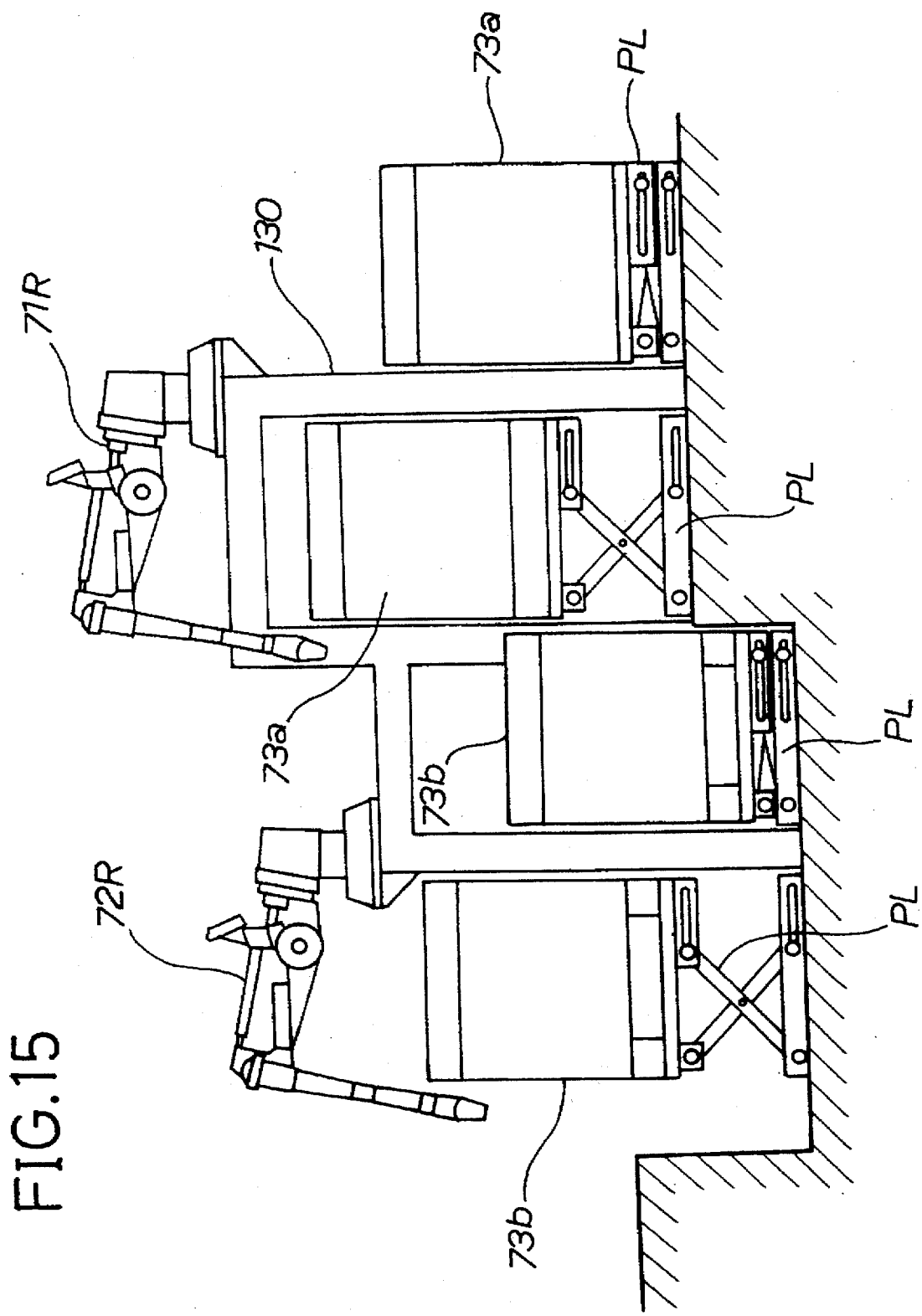
FIG. 15 is a front elevational view of transfer robots and baskets as taken in the direction along the line XV—XV of FIG. 10.

FIG. 15 is a detailed view of the loading robots and the panel containing means or baskets as viewed in the direction of the arrow along the line XV—XV of FIG. 10. The loading robots and the baskets are identical in construction to the robots and the baskets of the first embodiment shown in FIG. 6, and so no further description will be necessary. However, since different reference characters are used to designate identical parts, denomination of these parts will be given below for clarity. Reference character 71R is an upper loading robot, 72 a lower loading robot, 73a an upper basket, 73b a lower basket, PL a pantograph lift, and 130 a frame.

Two baskets 73a and 73a or 73b and 73b are disposed on opposite sides of each loading robot 71R (71L) or 72R (72L) for enabling a continuous operation of the robot in such a manner that when one basket 73a, for example, is filled up with the panels, then the subsequent panels are successively stacked or piled up in the other basket 73a during which time the filled basket 73a is replaced with a new empty basket 73a by an automatic guided vehicle (AGV), not shown.

Figure 16:
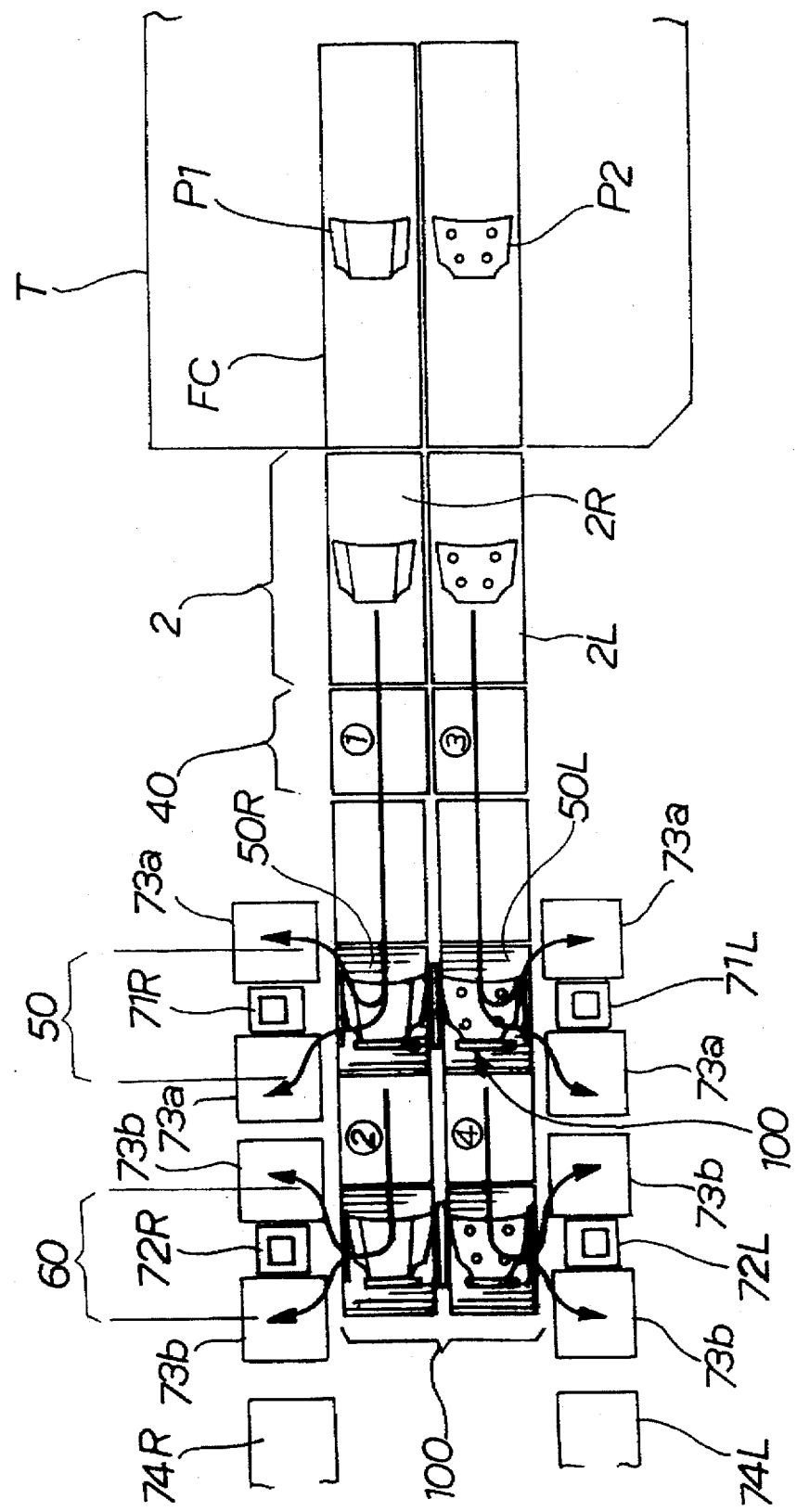
FIG. 16 is a diagrammatical view illustrative of the manner in which small panels are distributed by the panel distribution system according to the second embodiment.

FIG. 16 diagrammatically illustrates the operation of the panel distribution system taken to handle the small panels P1, P2. The small panels P1, P2 are subjected to a visual inspection as they are advanced by the right and left conveyors 2R and 2L. Subsequently, the small panels P1, P2 are delivered by the vertical two-directional delivery conveyor 40 selectively onto the upper loading conveyor 50 or the lower loading conveyor 60. Thereafter, the small panels P1 and P2 delivered onto the upper loading conveyor 50 are positioned by the panel positioning means 100 when they arrive at the right and left loading conveyors 50R and 50L. The positioned small panels P1 and P2 are loaded by the loading robots 71R and 71L into the baskets 73a, 73a. The same operational sequence may be said of the lower loading conveyors 60R, 60L.

As described above, the right and left small panels P1 and P2 press-formed on the a transfer press T are distributed along four routes indicated by the arrows shown in FIG. 16 with designation by encircled numerals 1, 2, 3 and 4, respectively, and successively stacked or piled up in a total of eight baskets.

Figure 17:
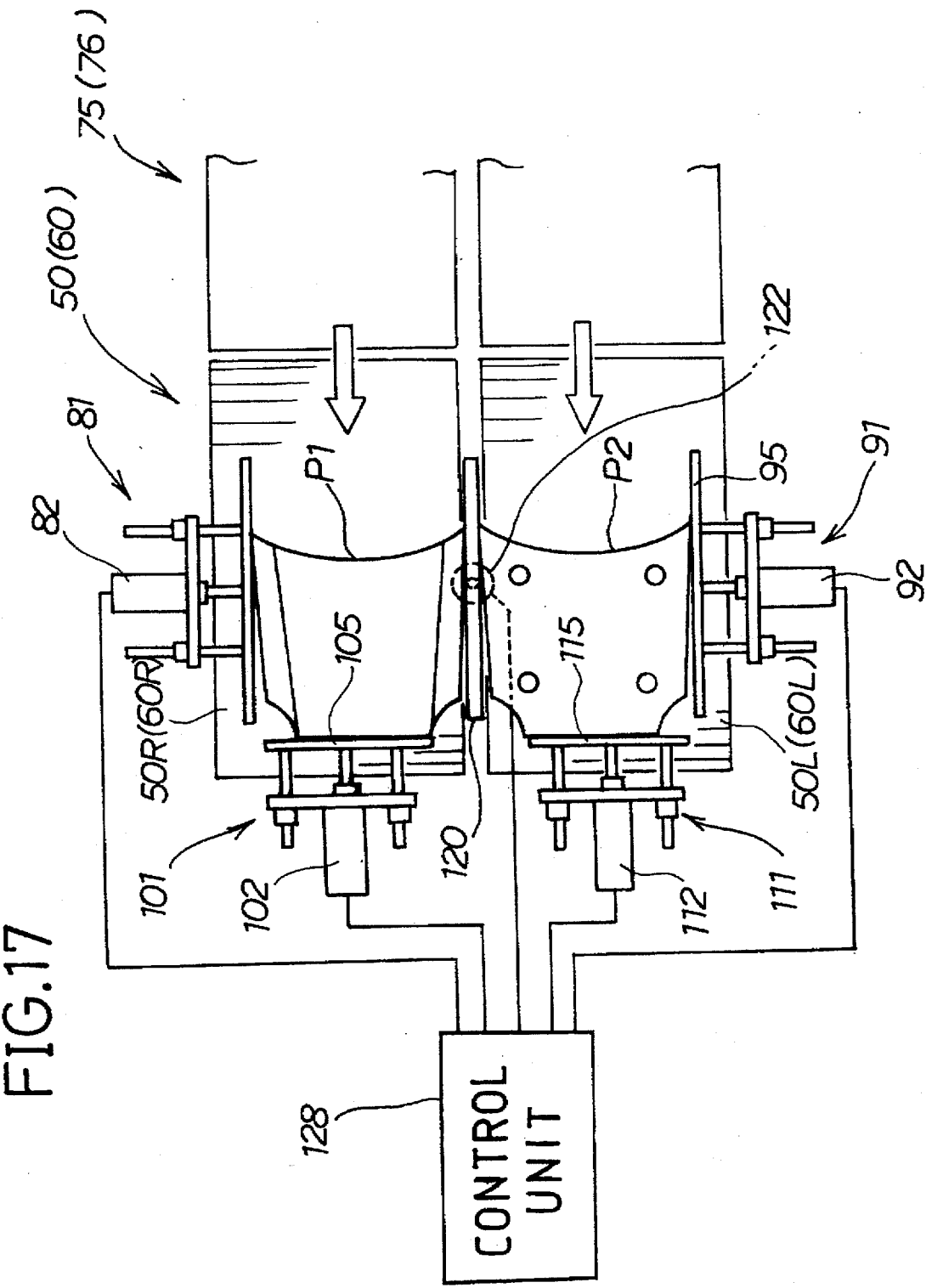
FIG. 17 is an explanatory view of a main portion of FIG. 16, showing the operation of the panel positioning means taken in combination with small panels.

FIG. 17 is a diagrammatical view illustrative of the operation of the panel positioning means 100 taken with respect to the small panels P1 and P2.

In this figure the numeral 128 designates a control unit or controller for controlling the panel positioning means 100 in such a manner that the lift cylinder 122 extends its cylinder rod to move the vertically movable center stopper 120 to the elevated position, that the right end pusher 101 operates to set the position of a front end of the small panel P1, for example, coming into the upper loading conveyor 50R, and the right pusher 81 is driven to force the small panel P1 against the center stopper 120 to set the final position of the small panel P1. The small panel P2 is positioned by the panel positioning means 100 in a similar manner under the control of the controller 128.

The small panels P1, P2 thus positioned on the upper loading conveyors by the panel positioning means 100 can be neatly stored in the baskets 73a via transportation or handling by the upper loading robots 71R, 71L (see FIG. 16).

FIG. 18 is a diagrammatical view illustrative of the operation taken when the panel positioning means 100 handles the large panels P3. The large panels P3 are conveyed as they are placed astride the right and left conveyors. In this case, the right and left conveyors are operated synchronously or in an interlocked condition. The large panels P3 are subjected to a visual inspection as they are advanced by the right and left conveyors 2R and 2L. Subsequently, the large panels P3 are delivered by the vertical two-directional delivery conveyor 40 selectively onto the upper loading conveyor 50 or the lower loading conveyor 60. Thereafter, the large panels P3 delivered onto the upper loading conveyor 50 are positioned by the panel positioning means 100 when they arrive at the right and left loading conveyors 50R and 50L. The same positioning operation is achieved by the positioning means 100 with respect to the large panels P3 delivered onto the lower loading conveyor 60. The positioned large panels P3 are loaded or transferred from the upper and lower loading conveyors 50, 60 onto the overhead conveyor 74R or 74L by the loading robots or other suitable means. Thus, the large panels P3 press-formed on the transfer press T are distributed along two routes indicated by the arrows shown in FIG. 16 with designation by encircled numerals 5 and 6, respectively.

Figure 19:
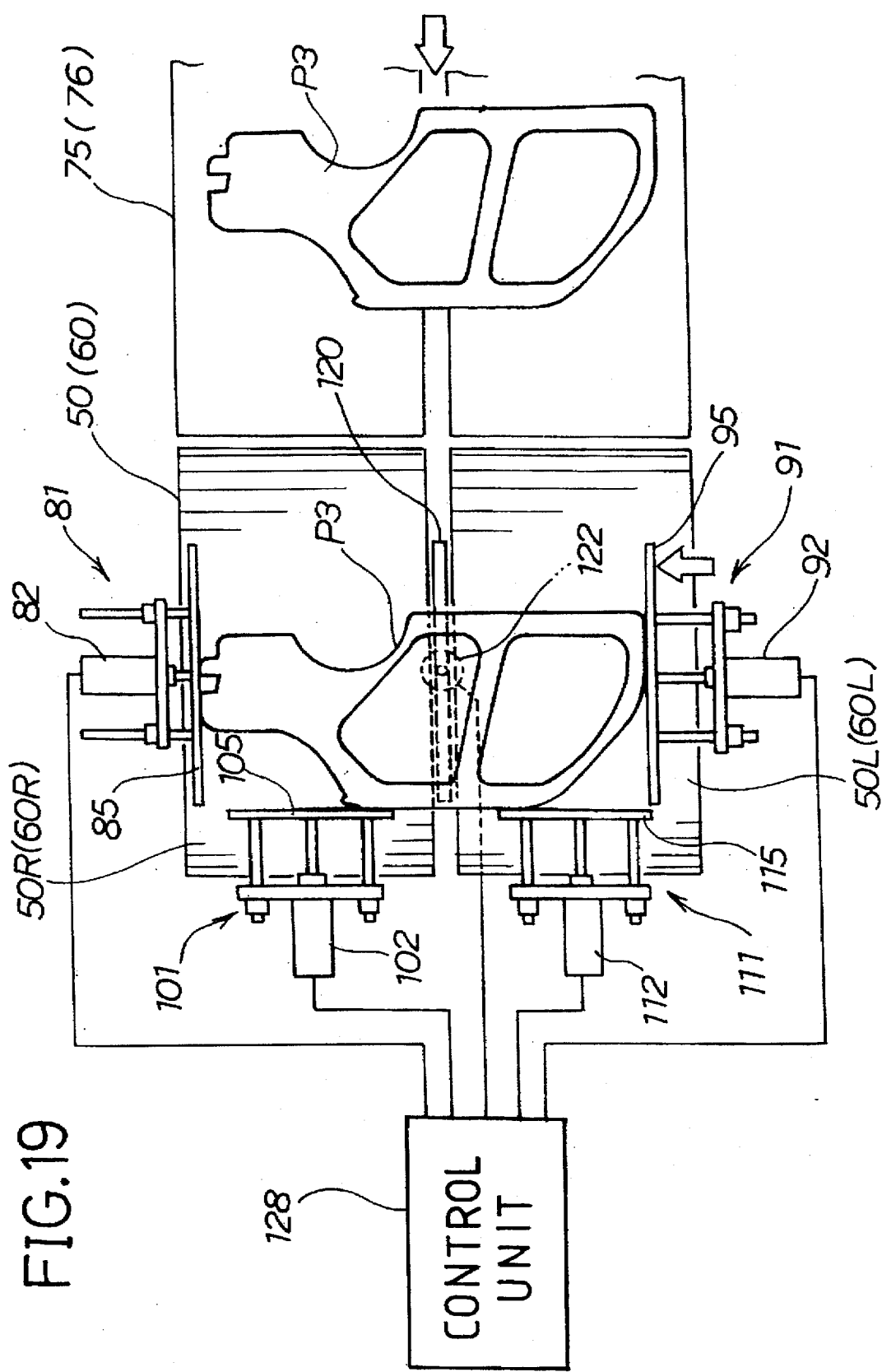

FIG. 19 is a diagrammatical view illustrative of the operation of the panel positioning means 100 taken with respect to the large panels P3.

In this figure the controller 128 operates to control the panel positioning means 100 in such a manner that the lift cylinder 122 contracts its cylinder rod to move the vertically movable center stopper 120 to the desended position in which the center stopper 120 is retracted downwardly from the line 125 (FIG. 14) to allow the large panels P3 to move into the upper loading conveyor 50 or the lower loading conveyor 60 with the panels P3 extending astride the right and left conveyors. In the case where the right pusher 81 is used as a positioning stopper, the controller 128 further operates in such a manner that the rod of the right cylinder 82 is contracted, and the left cylinder 92 of the left pusher 91 is activated to advance the left contact bar 95 so that the large panel P3 having arrived at the upper loading conveyor 60 is forced by the left contact bar 95 against the right contact bar 85 of the right pusher 81.

The right end pusher 101 or the left end pusher 111 may be composed of a fixed stopper. As an alternative, the end pusher 101 or 111 may be driven in response to the vertical movement of the center stopper 120 to achieve a function as a positioning stopper.

A panel distribution method of the present invention carried out by the panel distribution system of the second embodiment will be described below.

FIG. 20 is a schematic plan view illustrative of the panel distribution method of the present invention. For better understanding, the vertical two-directional delivery conveyor 40 is reillustrated as a horizontally movable two-directional delivery conveyor, and the upper and lower loading conveyors 50 and 60 are extended from the overlapping or two-storied construction into a single-story construction.

The delivery end (downstream end) of the two-directional delivery conveyor 40 is connectable with a first conveyor consisting of the upper loading conveyor 50 and with a second conveyor consisting of the lower loading conveyor 60. A first robot consisting of the upper loading robot 71 is associated with the upper loading conveyor 50, with two baskets 73a disposed on opposite sides of the robot 71. A second robot consisting of the lower loading robot 72 is associated with the lower loading conveyor 60, with two baskets 73b disposed on opposite sides of the robot 72. The small panels P1 are stored in succession into the basket 73a or 73b along the route indicated by the arrow in FIG. 20 with designation by the encircled numeral 1 or 2.

The panel distribution method of the present invention will be further described with reference to the flowchart shown in FIG. 21.

Firstly, a step ST01 computes the number of panels to be loaded by subtracting the number of loaded panels from the number of panels to be produced.

Then, a step ST02 makes a judgment as to whether or not the number of panels to be loaded is greater than a predetermined number (a capacity of the basket+α). The number of panels to be loaded may be equal to the predetermined number. α may be 10, for example, and is so determined as to preclude the occurrence of a condition in which several panels are left unloaded as a result of loading operation achieved for a few odd panels while the two-directional delivery conveyor 40 is fixed to one of its two alternative positions.

If the judgment at the step ST02 indicates that the number of panels to be loaded is less than the predetermined number, then the procedure goes on to a step ST03. Alternatively if the number of panels to be loaded is greater than the predetermined number, then the procedure returns to the step ST01. The step ST03 starts shifting down the production speed the transfer press T to the decelerating mode, and at the next step ST04 the downshift of the transfer press T to the deceleration mode is completed.

Subsequently, a step ST05 makes a judgment as to whether or not the number of panels loaded during a time period between the step ST03 and the step ST04 is equal to β. In this instance, if the number of the loaded panels is less than β, the procedure is standing on until the number of loaded panels becomes equal to β. The value of β is 8 to 15, for example, and represents the number of panels loaded by the loading robot during a time period starting from the issuance of a decelerating command and ending when the panel-to-panel interval reaches a predetermined upper limit as a result of deceleration or downshift of the transfer press T. When the number of loaded panels is equal to β, the procedure advances to a step ST06.

The step ST06 sets the vertical two-directional delivery conveyor 40 to its one of two alternative positions which is connected to one of the upper and lower loading conveyors. When a space in the first or upper basket 73a available for loading additional panels (i.e., the number of additional panels receivable in the upper basket 73a) is greater than the space in the second or lower basket 73b, the two-directional delivery conveyor 40 is fixed to a position connected to the upper loading conveyor 73a. Subsequently, a step ST07 loads the panels P1 in succession into the first or upper basket 73a alone.

In many cases, the production of panels is completed while the remaining panels are being loaded in the first basket 73a. In these cases, the second basket 73b remains unloaded or contains nothing. It may occur, however, that the production of panels is not completed while the remaining panels are being loaded in the first basket 73a. To deal with this condition, the following procedures are provided according to the method of this invention.

A step ST08 makes a judgment as to whether or not the first or upper basket 73a is (or might be) filled up with panels. If the upper basket 73a is filled up with panels, then the procedure goes on to a step ST09. Alternatively, if the upper basket 73a is not yet filled up with panels, the procedure returns to the step ST07.

The step ST09 shifts the position of the two-directional delivery conveyor 40 from the first or upper loading conveyor 50 side to the second or lower loading conveyor 60 side. Subsequently, a step ST10 loads the panels into the second or lower basket 73b.

In this case, the first basket 73a is already filled up with panels, however, the second basket 73b provides a small space for the loading of a few odd panels.

Obviously, various minor changes and modifications of the present invention are possible in the light of the above teaching. It is therefore to be understood that within the scope of the appended claims the invention may be practiced otherwise than as specifically described.

What is claimed is:

1. A panel distribution system for distributing panels coming out from a transfer press, comprising:
    a pair of juxtaposed vertical two-directional delivery conveyors for directing the panels coming out from the transfer press, selectively into an upper position and a lower position;
    a pair of juxtaposed loading stations each composed of a pair of overlapping upper and lower loading conveyors disposed adjacent to a delivery end of a corresponding one of said vertical two-directional delivery conveyors for receiving the panels at said upper position and said lower position, respectively, and then transferring the panels in a downstream direction;
    said vertical two-directional delivery conveyors and said loading stations extending linearly from the transfer press and jointly defining a straight conveyance line;
    said upper loading conveyors of said pair of loading stations including first panel positioning means for positioning the panels such that when two small panels are being conveyed on said upper loading conveyors, the small panels are positioned on the respective upper loading conveyors independently from each other, and when one large panel is being conveyed on said upper loading conveyors, the large panel is positioned on said upper loading conveyors;
    said lower loading conveyors of said pair of loading stations including second panel positioning means for positioning the panels such that when two small panels are being conveyed on said lower loading conveyors, the small panels are positioned on the respective lower loading conveyors independently from each other, and when one large panel is being conveyed on said lower loading conveyors, the large panel is positioned on said lower loading conveyors; and
    control means for controlling operation of said first and second panel positioning means.

2. A panel distribution system according to claim 1, wherein said first panel positioning means comprises a right pusher and a left pusher disposed on opposite sides of said upper loading conveyors for forcing the panel laterally inwardly of said upper loading conveyors, and a center stopper disposed between said upper loading conveyors and vertically movable between an elevated position in which said center stopper partly projects from an upper surface of said upper loading conveyors, and a descended position in which said center stopper is retracted from said upper surface of said upper loading conveyors, and wherein said second panel positioning means comprises a right pusher and a left pusher disposed on opposite sides of said lower loading conveyors for forcing the panel laterally inwardly of said lower loading conveyors, and a center stopper disposed between said lower loading conveyors and vertically movable between an elevated position in which said center stopper partly projects from an upper surface of said lower loading conveyors, and a descended position in which said center stopper is retracted from said upper surface of said lower loading conveyors.

3. A panel distribution system according to claim 1, further including a robot closely disposed on one side of each of said loading conveyors, and a pair of baskets disposed on opposite sides of said robot for receiving therein the panels transferred from each loading conveyor by said robot.

4. A panel distribution system for distributing panels press-formed on a transfer press, comprising:
    a conveyance line to take the panels from the transfer press;
    a plurality of delivery units disposed on said conveyance line and spaced from each other along a longitudinal direction of said conveyance line to force out the panels in a lateral direction from said conveyance line; and
    a plurality of loading conveyors, each associated with a corresponding one of said plural delivery units, to receive the panels delivered from the corresponding delivery units and to load the panels into a container, wherein said loading conveyors are disposed on a same side of said conveyance line and are aligned with the respective delivery units, said delivery units, except one delivery unit located closer to a downstream end of said conveyance line, are operative to allow the passage of the panels therethrough, and each of said delivery units includes a plate slidably movable transversely across said conveyance line to deliver the panels one at a time to the corresponding loading conveyor, said plates being vertically movable toward and away from a surface of said conveyance line.

5. A panel distribution system for distributing panels press-formed on a transfer press, comprising:

a conveyance line for taking out the panels from the transfer press;

a plurality of delivery units disposed on said conveyance line and spaced from each other along a longitudinal direction of said conveyance line to force out the panels in a lateral direction from said conveyance line; and a plurality of loading conveyors, each associated with a corresponding one of said plural delivery units, to receive the panels delivered from the corresponding delivery units and to load the panels into a container, said loading conveyors being disposed on the same side of said conveyance line and aligned with the respective delivery units, and having a two-storied construction including a pair of overlapping upper and lower loading conveyors, and vertical two-directional delivery conveyors, disposed between each of said delivery units and a corresponding one of said loading conveyors, for delivering the panels selectively to said upper loading conveyor and said lower loading conveyor of said corresponding loading conveyor; and wherein said delivery units, except one delivery unit located closer to a downstream end of said conveyance line, are operative to allow the passage of the panels therethrough.

6. A panel distribution system according to claim 5, further comprising two two-storied loading conveyors composed of a pair of overlapping upper and lower loading conveyors, said two-storied loading conveyors being arranged side by side, and a robot closely disposed on one side of each of said loading conveyors, and a pair of baskets disposed on opposite sides of said robot for receiving therein the panels transferred from each loading conveyor by said robot.

7. A panel distribution system according to claim 6, further including an overhead hanger disposed at a downstream end of each of said lower loading conveyors for receiving the panels from said lower loading conveyors.

8. A method of distributing panels from a transfer press into a first basket and a second basket via a panel distribution system including a two-directional delivery conveyor for delivering panels coming out from a transfer press into an upper position and a lower position, an upper loading conveyor and a lower loading conveyor contiguous to said upper position and said lower position, respectively, for transferring the panels, a plurality of said first baskets provided for said upper loading conveyor, and a plurality of said second baskets provided with said lower loading conveyor, said method comprising the steps of:

determining a number of panels to be loaded from a difference between a number of panels to be produced and a number of loaded panels;

judging whether the number of panels to be loaded is less than a predetermined number;

reducing a production speed of the transfer press when the number of panels to be loaded is less than said predetermined number;

fixing the position of said two-directional delivery conveyor, when the number of panels to be loaded is less than said predetermined number, to one of said upper position and said lower position, thereby delivering the panels only onto one of said upper loading conveyor and lower loading conveyor; and loading the remaining panels serially into one of said first basket and said second basket.

9. A method according to claim 8, further including the steps of:

judging whether said one of said first basket and said second basket is filled up with panels;

changing the position of said two-directional delivery conveyor, when said one of said first basket and second basket is filled up with panels, to the other of said upper and lower position, thereby delivering the panels only onto the other of said upper and lower loading conveyor; and loading the remaining panels serially into the other of said first and second basket.

* * * * *